United States Patent
Olligschlaeger et al.

(10) Patent No.: US 9,552,417 B2
(45) Date of Patent: Jan. 24, 2017

(54) SYSTEM AND METHOD FOR MULTI-MODAL AUDIO MINING OF TELEPHONE CONVERSATIONS

(71) Applicant: **Global Tel*Link Corp.**, Reston, VA (US)

(72) Inventors: Andreas M. Olligschlaeger, Baden, PA (US); Jim Rokosky, Altoona, PA (US)

(73) Assignee: **Global Tel*Link Corp.**, Reston, VA (US)

( * ) Notice: Subject to any disclaimer, the term of this patent is extended or adjusted under 35 U.S.C. 154(b) by 234 days.

(21) Appl. No.: 14/281,323

(22) Filed: May 19, 2014

(65) Prior Publication Data

US 2014/0254777 A1 Sep. 11, 2014

Related U.S. Application Data

(63) Continuation of application No. 12/032,200, filed on Feb. 15, 2008, now Pat. No. 8,731,934.

(Continued)

(51) Int. Cl.
*H04M 3/22* (2006.01)
*G06F 17/30* (2006.01)
(Continued)

(52) U.S. Cl.
CPC ......... *G06F 17/30746* (2013.01); *G10L 15/26* (2013.01); *H04M 3/2281* (2013.01); *H04M 3/42221* (2013.01); *H04M 2201/40* (2013.01)

(58) Field of Classification Search
CPC ............. H04M 2201/40; H04M 3/2281; G06F 17/30746
See application file for complete search history.

(56) References Cited

U.S. PATENT DOCUMENTS 4,054,756 A 10/1977 Comella et al.
4,191,860 A 3/1980 Weber
(Continued)

FOREIGN PATENT DOCUMENTS

EP 1280137 B1 12/2004
EP 2579676 A1 4/2013
(Continued)

OTHER PUBLICATIONS

Newton, H., Newton's Telecom Dictionary (18th ed. 2002); p. 655.
(Continued)

*Primary Examiner* — Jianlong He
(74) *Attorney, Agent, or Firm* — Sterne, Kessler, Goldstein & Fox PLLC

(57) ABSTRACT

A system and method for the automated monitoring of inmate telephone calls as well as multi-modal search, retrieval and playback capabilities for said calls. A general term for such capabilities is multi-modal audio mining. The invention is designed to provide an efficient means for organizations such as correctional facilities to identify and monitor the contents of telephone conversations and to provide evidence of possible inappropriate conduct and/or criminal activity of inmates by analyzing monitored telephone conversations for events, including, but not limited to, the addition of third parties, the discussion of particular topics, and the mention of certain entities.

20 Claims, 8 Drawing Sheets

Related U.S. Application Data

(60) Provisional application No. 60/901,342, filed on Feb. 15, 2007.

(51) Int. Cl.
*H04M 3/42* (2006.01)
*G10L 15/26* (2006.01)

(56) References Cited

U.S. PATENT DOCUMENTS

| | | |
|---|---|---|
| 4,670,628 A | 6/1987 | Boratgis et al. |
| 4,691,347 A | 9/1987 | Stanley et al. |
| 4,737,982 A | 4/1988 | Boratgis et al. |
| 4,813,070 A | 3/1989 | Humphreys et al. |
| 4,907,221 A | 3/1990 | Pariani et al. |
| 4,918,719 A | 4/1990 | Daudelin |
| 4,935,956 A | 6/1990 | Hellwarth et al. |
| 4,943,973 A | 7/1990 | Werner |
| 4,995,030 A | 2/1991 | Helf |
| 5,185,781 A | 2/1993 | Dowden et al. |
| 5,210,789 A | 5/1993 | Jeffus et al. |
| 5,229,764 A | 7/1993 | Matchett et al. |
| 5,291,548 A | 3/1994 | Tsumura et al. |
| 5,319,702 A | 6/1994 | Kitchin et al. |
| 5,319,735 A | 6/1994 | Preuss et al. |
| 5,345,501 A | 9/1994 | Shelton |
| 5,345,595 A | 9/1994 | Johnson et al. |
| 5,379,345 A | 1/1995 | Greenberg |
| 5,425,091 A | 6/1995 | Josephs |
| 5,438,616 A | 8/1995 | Peoples |
| 5,469,370 A | 11/1995 | Ostrover et al. |
| 5,485,507 A | 1/1996 | Brown et al. |
| 5,502,762 A | 3/1996 | Andrew et al. |
| 5,517,555 A | 5/1996 | Amadon et al. |
| 5,535,194 A | 7/1996 | Ashley et al. |
| 5,535,261 A | 7/1996 | Brown et al. |
| 5,539,731 A | 7/1996 | Haneda et al. |
| 5,539,812 A | 7/1996 | Kitchin et al. |
| 5,555,551 A | 9/1996 | Rudokas et al. |
| 5,583,925 A | 12/1996 | Bernstein |
| 5,590,171 A | 12/1996 | Howe |
| 5,592,548 A | 1/1997 | Sih |
| 5,613,004 A | 3/1997 | Cooperman |
| 5,619,561 A | 4/1997 | Reese |
| 5,627,887 A | 5/1997 | Freedman |
| 5,634,086 A | 5/1997 | Rtischev et al. |
| 5,634,126 A | 5/1997 | Norell |
| 5,636,292 A | 6/1997 | Rhoads |
| 5,640,490 A | 6/1997 | Hansen et al. |
| 5,646,940 A | 7/1997 | Hotto |
| 5,649,060 A | 7/1997 | Ellozy et al. |
| 5,655,013 A | 8/1997 | Gainsboro |
| 5,675,704 A | 10/1997 | Juang et al. |
| 5,687,236 A | 11/1997 | Moskowitz |
| 5,710,834 A | 1/1998 | Rhoads |
| 5,719,937 A | 2/1998 | Warren et al. |
| 5,745,558 A | 4/1998 | Richardson, Jr. et al. |
| 5,745,569 A | 4/1998 | Moskowitz |
| 5,745,604 A | 4/1998 | Rhoads |
| 5,748,726 A | 5/1998 | Unno |
| 5,748,763 A | 5/1998 | Rhoads |
| 5,748,783 A | 5/1998 | Rhoads |
| 5,757,889 A | 5/1998 | Ohtake |
| 5,768,355 A | 6/1998 | Salibrici |
| 5,768,426 A | 6/1998 | Rhoads |
| 5,774,452 A | 6/1998 | Wolosewicz |
| 5,793,415 A | 8/1998 | Gregory, III et al. |
| 5,796,811 A | 8/1998 | McFarlen |
| 5,805,685 A | 9/1998 | McFarlen |
| 5,809,462 A | 9/1998 | Nussbaum |
| 5,822,432 A | 10/1998 | Moskowitz |
| 5,822,436 A | 10/1998 | Rhoads |
| 5,832,068 A | 11/1998 | Smith |
| 5,832,119 A | 11/1998 | Rhoads |
| 5,835,486 A | 11/1998 | Davis et al. |
| 5,841,886 A | 11/1998 | Rhoads |
| 5,841,978 A | 11/1998 | Rhoads |
| 5,850,481 A | 12/1998 | Rhoads |
| 5,861,810 A | 1/1999 | Nguyen |
| 5,862,260 A | 1/1999 | Rhoads |
| 5,867,562 A | 2/1999 | Scherer |
| 5,883,945 A | 3/1999 | Richardson et al. |
| 5,889,868 A | 3/1999 | Moskowitz |
| 5,899,972 A | 5/1999 | Miyazawa et al. |
| 5,907,602 A | 5/1999 | Peel et al. |
| 5,915,001 A | 6/1999 | Uppaluru |
| 5,920,834 A | 7/1999 | Sih et al. |
| 5,926,533 A | 7/1999 | Gainsboro |
| 5,930,369 A | 7/1999 | Cox et al. |
| 5,930,377 A | 7/1999 | Powell et al. |
| 5,937,035 A | 8/1999 | Andruska et al. |
| 5,953,049 A | 9/1999 | Horn et al. |
| 5,960,080 A | 9/1999 | Fahlman et al. |
| 5,963,909 A | 10/1999 | Warren et al. |
| 5,982,891 A | 11/1999 | Ginter et al. |
| 5,991,373 A | 11/1999 | Pattison et al. |
| 5,999,828 A | 12/1999 | Sih et al. |
| 6,011,849 A | 1/2000 | Orrin |
| 6,026,193 A | 2/2000 | Rhoads |
| 6,035,034 A | 3/2000 | Trump |
| 6,038,315 A | 3/2000 | Strait et al. |
| 6,052,454 A | 4/2000 | Kek et al. |
| 6,052,462 A | 4/2000 | Lu |
| 6,058,163 A | 5/2000 | Pattison et al. |
| 6,064,963 A | 5/2000 | Gainsboro |
| 6,072,860 A | 6/2000 | Kek et al. |
| 6,078,567 A | 6/2000 | Traill et al. |
| 6,078,645 A | 6/2000 | Cai et al. |
| 6,078,807 A | 6/2000 | Dunn et al. |
| 6,111,954 A | 8/2000 | Rhoads |
| 6,118,860 A | 9/2000 | Hillson et al. |
| 6,122,392 A | 9/2000 | Rhoads |
| 6,122,403 A | 9/2000 | Rhoads |
| 6,138,119 A | 10/2000 | Hall et al. |
| 6,141,406 A | 10/2000 | Johnson |
| 6,160,903 A | 12/2000 | Hamid et al. |
| 6,173,284 B1 | 1/2001 | Brown |
| 6,175,831 B1 | 1/2001 | Weinreich et al. |
| 6,185,416 B1 | 2/2001 | Rudokas et al. |
| 6,185,683 B1 | 2/2001 | Ginter et al. |
| 6,205,249 B1 | 3/2001 | Moskowitz |
| 6,219,640 B1 | 4/2001 | Basu et al. |
| 6,233,347 B1 | 5/2001 | Chen et al. |
| 6,237,786 B1 | 5/2001 | Ginter et al. |
| 6,243,480 B1 | 6/2001 | Zhao et al. |
| 6,243,676 B1 | 6/2001 | Witteman |
| 6,253,193 B1 | 6/2001 | Ginter et al. |
| 6,263,507 B1 | 7/2001 | Ahmad et al. |
| 6,266,430 B1 | 7/2001 | Rhoads |
| 6,278,772 B1 | 8/2001 | Bowater et al. |
| 6,278,781 B1 | 8/2001 | Rhoads |
| 6,289,108 B1 | 9/2001 | Rhoads |
| 6,301,360 B1 | 10/2001 | Bocioncek et al. |
| 6,308,171 B1 | 10/2001 | De La Huerga |
| 6,312,911 B1 | 11/2001 | Bancroft |
| 6,314,192 B1 | 11/2001 | Chen et al. |
| 6,324,573 B1 | 11/2001 | Rhoads |
| 6,324,650 B1 | 11/2001 | Ogilvie |
| 6,330,335 B1 | 12/2001 | Rhoads |
| 6,343,138 B1 | 1/2002 | Rhoads |
| 6,343,738 B1 | 2/2002 | Ogilvie |
| 6,345,252 B1 | 2/2002 | Beigi et al. |
| 6,381,321 B1 | 4/2002 | Brown et al. |
| 6,389,293 B1 | 5/2002 | Clore et al. |
| 6,421,645 B1 | 7/2002 | Beigi et al. |
| 6,526,380 B1 | 2/2003 | Thelen et al. |
| 6,542,602 B1 | 4/2003 | Elazar |
| 6,611,583 B1* | 8/2003 | Gainsboro .................... 379/188 |
| 6,625,261 B2 | 9/2003 | Holtzberg |
| 6,625,587 B1 | 9/2003 | Erten et al. |
| 6,633,846 B1 | 10/2003 | Bennett et al. |
| 6,636,591 B1 | 10/2003 | Swope et al. |
| 6,639,977 B1 | 10/2003 | Swope et al. |
| 6,639,978 B2 | 10/2003 | Draizin et al. |

(56) References Cited

U.S. PATENT DOCUMENTS

| | | |
|---|---|---|
| 6,647,096 B1 | 11/2003 | Milliorn et al. |
| 6,665,376 B1 | 12/2003 | Brown |
| 6,665,644 B1 | 12/2003 | Kanevsky et al. |
| 6,668,044 B1 * | 12/2003 | Schwartz et al. ............... 379/68 |
| 6,668,045 B1 | 12/2003 | Mow |
| 6,671,292 B1 | 12/2003 | Haartsen |
| 6,688,518 B1 | 2/2004 | Valencia et al. |
| 6,728,345 B2 | 4/2004 | Glowny et al. |
| 6,728,682 B2 | 4/2004 | Fasciano |
| 6,748,356 B1 | 6/2004 | Beigi et al. |
| 6,760,697 B1 | 7/2004 | Neumeyer et al. |
| 6,763,099 B1 | 7/2004 | Blink |
| 6,782,370 B1 | 8/2004 | Stack |
| 6,788,772 B2 | 9/2004 | Barak et al. |
| 6,810,480 B1 | 10/2004 | Parker et al. |
| 6,850,609 B1 | 2/2005 | Schrage |
| 6,880,171 B1 | 4/2005 | Ahmad et al. |
| 6,895,086 B2 | 5/2005 | Martin |
| 6,898,612 B1 | 5/2005 | Parra et al. |
| 6,907,387 B1 | 6/2005 | Reardon |
| 6,920,209 B1 | 7/2005 | Gainsboro |
| 6,947,525 B2 | 9/2005 | Benco |
| 6,970,554 B1 | 11/2005 | Peterson et al. |
| 7,032,007 B2 | 4/2006 | Fellenstein et al. |
| 7,035,386 B1 | 4/2006 | Susen et al. |
| 7,039,171 B2 | 5/2006 | Gickler |
| 7,039,585 B2 | 5/2006 | Wilmot et al. |
| 7,046,779 B2 | 5/2006 | Hesse |
| 7,050,918 B2 | 5/2006 | Pupalaikis et al. |
| 7,062,286 B2 | 6/2006 | Grivas et al. |
| 7,075,919 B1 | 7/2006 | Wendt et al. |
| 7,079,636 B1 | 7/2006 | McNitt et al. |
| 7,079,637 B1 | 7/2006 | McNitt et al. |
| 7,092,494 B1 | 8/2006 | Anders et al. |
| 7,103,549 B2 | 9/2006 | Bennett et al. |
| 7,106,843 B1 | 9/2006 | Gainsboro et al. |
| 7,123,704 B2 | 10/2006 | Martin |
| 7,133,511 B2 | 11/2006 | Buntin et al. |
| 7,133,828 B2 | 11/2006 | Scarano et al. |
| 7,133,845 B1 | 11/2006 | Ginter et al. |
| 7,149,788 B1 | 12/2006 | Gundla et al. |
| 7,191,133 B1 | 3/2007 | Pettay |
| 7,197,560 B2 | 3/2007 | Caslin et al. |
| 7,248,685 B2 | 7/2007 | Martin |
| 7,256,816 B2 | 8/2007 | Profanchik et al. |
| 7,277,468 B2 | 10/2007 | Tian et al. |
| 7,324,637 B2 | 1/2008 | Brown et al. |
| 7,333,798 B2 | 2/2008 | Hodge |
| 7,417,983 B2 | 8/2008 | He et al. |
| 7,424,715 B1 | 9/2008 | Dutton |
| 7,466,816 B2 | 12/2008 | Blair |
| 7,494,061 B2 | 2/2009 | Reinhold |
| 7,496,345 B1 | 2/2009 | Rae et al. |
| 7,505,406 B1 | 3/2009 | Spadaro et al. |
| 7,519,169 B1 | 4/2009 | Hingoranee et al. |
| 7,529,357 B1 | 5/2009 | Rae et al. |
| 7,551,732 B2 | 6/2009 | Anders |
| 7,596,498 B2 | 9/2009 | Basu et al. |
| 7,639,791 B2 | 12/2009 | Hodge |
| 7,664,243 B2 | 2/2010 | Martin |
| 7,672,845 B2 | 3/2010 | Beranek et al. |
| 7,698,182 B2 | 4/2010 | Falcone et al. |
| 7,742,581 B2 | 6/2010 | Hodge et al. |
| 7,742,582 B2 | 6/2010 | Harper |
| 7,783,021 B2 | 8/2010 | Hodge |
| 7,826,604 B2 | 11/2010 | Martin |
| 7,848,510 B2 | 12/2010 | Shaffer et al. |
| 7,853,243 B2 | 12/2010 | Hodge |
| 7,860,222 B1 | 12/2010 | Sidler et al. |
| 7,881,446 B1 | 2/2011 | Apple et al. |
| 7,899,167 B1 | 3/2011 | Rae |
| 7,961,860 B1 | 6/2011 | McFarlen |
| 8,135,115 B1 | 3/2012 | Hogg, Jr. et al. |
| 8,204,177 B2 | 6/2012 | Harper |
| 8,295,446 B1 | 10/2012 | Apple et al. |
| 8,458,732 B2 | 6/2013 | Hanna et al. |
| 8,488,756 B2 | 7/2013 | Hodge et al. |
| 8,509,390 B2 | 8/2013 | Harper |
| 8,577,003 B2 | 11/2013 | Rae |
| 8,731,934 B2 | 5/2014 | Olligschlaeger et al. |
| 8,886,663 B2 | 11/2014 | Gainsboro et al. |
| 8,929,525 B1 | 1/2015 | Edwards |
| 9,043,813 B2 | 5/2015 | Hanna et al. |
| 9,077,680 B2 | 7/2015 | Harper |
| 2001/0036821 A1 | 11/2001 | Gainsboro et al. |
| 2001/0043697 A1 | 11/2001 | Cox et al. |
| 2001/0056349 A1 | 12/2001 | St. John |
| 2001/0056461 A1 | 12/2001 | Kampe et al. |
| 2002/0002464 A1 | 1/2002 | Petrushin |
| 2002/0010587 A1 | 1/2002 | Pertrushin |
| 2002/0032566 A1 | 3/2002 | Tzirkel-Hancock et al. |
| 2002/0046057 A1 | 4/2002 | Ross |
| 2002/0067272 A1 | 6/2002 | Lemelson et al. |
| 2002/0069084 A1 | 6/2002 | Donovan |
| 2002/0076014 A1 | 6/2002 | Holtzberg |
| 2002/0107871 A1 | 8/2002 | Wyzga et al. |
| 2002/0147707 A1 | 10/2002 | Kraay et al. |
| 2002/0174183 A1 | 11/2002 | Saeidi |
| 2003/0002639 A1 | 1/2003 | Huie |
| 2003/0023444 A1 | 1/2003 | St. John |
| 2003/0023874 A1 | 1/2003 | Prokupets et al. |
| 2003/0040326 A1 | 2/2003 | Levy et al. |
| 2003/0070076 A1 | 4/2003 | Michael |
| 2003/0086546 A1 | 5/2003 | Falcone et al. |
| 2003/0093533 A1 | 5/2003 | Ezerzer et al. |
| 2003/0099337 A1 | 5/2003 | Lord |
| 2003/0126470 A1 | 7/2003 | Crites et al. |
| 2003/0174826 A1 | 9/2003 | Hesse |
| 2003/0190045 A1 | 10/2003 | Huberman et al. |
| 2004/0008828 A1 | 1/2004 | Coles et al. |
| 2004/0029564 A1 | 2/2004 | Hodge |
| 2004/0081296 A1 | 4/2004 | Brown et al. |
| 2004/0161086 A1 | 8/2004 | Buntin et al. |
| 2004/0169683 A1 | 9/2004 | Chiu et al. |
| 2004/0249650 A1 | 12/2004 | Freedman et al. |
| 2004/0252184 A1 | 12/2004 | Hesse et al. |
| 2004/0252447 A1 | 12/2004 | Hesse et al. |
| 2005/0010411 A1 | 1/2005 | Rigazio et al. |
| 2005/0027723 A1 | 2/2005 | Jones et al. |
| 2005/0080625 A1 | 4/2005 | Bennett et al. |
| 2005/0094794 A1 | 5/2005 | Creamer et al. |
| 2005/0102371 A1 | 5/2005 | Aksu |
| 2005/0114192 A1 | 5/2005 | Tor et al. |
| 2005/0125226 A1 | 6/2005 | Magee |
| 2005/0128283 A1 | 6/2005 | Bulriss et al. |
| 2005/0141678 A1 | 6/2005 | Anders et al. |
| 2005/0144004 A1 | 6/2005 | Bennett et al. |
| 2005/0170818 A1 | 8/2005 | Netanel et al. |
| 2005/0182628 A1 | 8/2005 | Choi |
| 2005/0207357 A1 | 9/2005 | Koga |
| 2006/0064037 A1 | 3/2006 | Shalon et al. |
| 2006/0087554 A1 | 4/2006 | Boyd et al. |
| 2006/0087555 A1 | 4/2006 | Boyd et al. |
| 2006/0093099 A1 * | 5/2006 | Cho ........................ 379/88.14 |
| 2006/0198504 A1 | 9/2006 | Shemisa et al. |
| 2006/0200353 A1 | 9/2006 | Bennett |
| 2006/0285650 A1 | 12/2006 | Hodge |
| 2006/0285665 A1 | 12/2006 | Wasserblat et al. |
| 2007/0011008 A1 * | 1/2007 | Scarano et al. ............... 704/254 |
| 2007/0041545 A1 | 2/2007 | Gainsboro |
| 2007/0047734 A1 | 3/2007 | Frost |
| 2007/0071206 A1 | 3/2007 | Gainsboro |
| 2007/0133437 A1 | 6/2007 | Wengrovitz et al. |
| 2007/0185717 A1 | 8/2007 | Bennett |
| 2007/0237099 A1 | 10/2007 | He et al. |
| 2007/0244690 A1 | 10/2007 | Peters |
| 2008/0000966 A1 | 1/2008 | Keiser |
| 2008/0021708 A1 | 1/2008 | Bennett et al. |
| 2008/0046241 A1 | 2/2008 | Osburn et al. |
| 2008/0106370 A1 | 5/2008 | Perez et al. |
| 2008/0118045 A1 | 5/2008 | Polozola et al. |
| 2008/0195387 A1 | 8/2008 | Zigel et al. |
| 2008/0198978 A1 | 8/2008 | Olligschlaeger |
| 2008/0201143 A1 | 8/2008 | Olligschlaeger et al. |

(56) References Cited

U.S. PATENT DOCUMENTS

| | | | |
|---|---|---|---|
| 2008/0201158 A1 | 8/2008 | Johnson et al. |
| 2008/0260133 A1 | 10/2008 | Hodge et al. |
| 2008/0300878 A1 | 12/2008 | Bennett |
| 2010/0177881 A1 | 7/2010 | Hodge |
| 2010/0202595 A1 | 8/2010 | Hodge et al. |
| 2010/0299761 A1 | 11/2010 | Shapiro |
| 2011/0055256 A1 | 3/2011 | Phillips et al. |
| 2013/0179949 A1 | 7/2013 | Shapiro |

FOREIGN PATENT DOCUMENTS

| | | |
|---|---|---|
| GB | 2 075313 | 11/1981 |
| JP | 59225626 | 12/1984 |
| JP | 60010821 | 1/1985 |
| JP | 61135239 | 6/1986 |
| JP | 3065826 | 3/1991 |
| WO | WO 96/14703 A1 | 11/1995 |
| WO | WO 98/13993 | 4/1998 |
| WO | WO 01/74042 A2 | 10/2001 |

OTHER PUBLICATIONS

"The AutoEDMS Document Management and Workflow System: An Overview of Key Features, Functions and Cpabilities," ACS Software, May 2003.
"PacketCable™ Audio/Video Codecs Specification," Cable Television Laboratories, Inc., Ser. No. PKT-SP-CODEC-I05-040113 (2004).
Kozamernik, F., "Media Streaming over the Internet—an overview of delivery technologies," EBU Technical Review (Oct. 2002).
Fleischman, E., "Advanced Streaming Format (ASF) Specification," Microsoft Corporation (Jan. 9, 1998).
USPTO Class Definition, Class 379 Telephonic Communications, available at http://www.uspto.gov/web/patents/classification/uspc379/defs379.htm.
Excerpts from the Prosecution History of U.S. Appl. No. 10/135,878, filed Apr. 29, 2002.
Definition of "telephony" McGraw-Hill Dictionary of Scientific and Technical Terms, 6th Edition (McGraw-Hill, 2003).
Response to Office Action, filed Jan. 6, 2009, in Prosecution History of U.S. Appl. No. 10/642,532, filed Aug. 15, 2003.
Definition of "logic", IEEE 100: The Authoritative Dictionary of IEEE Standard Terms, Seventh Edition, Standards Information Network, IEEE Press (2000).
Amendment and Response Under 37 C.F.R. §1.111 dated Sep. 30, 2011, in U.S. Appl. No. 11/706,431.
Bender, W., et al., "Techniques For Data Hiding," IBM Systems Journal, vol. 35, Nos. 3&4, 1996.
Boney, L., et al., "Digital Watermarks for Audio Signals" Proceedings of the International Conference on Multimedia Computing Systems, p. 473-480, IEEE Computer Society Press, United States (1996).
Boney, L., et al., "Digital Watermarks for Audio Signals" Proceedings of EUSIPC0-96, Eighth European Signal processing Conference, Trieste, Italy, 10-13 (1996).
Cox, I. J., et al.; "Secure Spread Spectrum Watermarking for Multimedia," NEC Research Institute, Technical Report 95-10, Dec. 1997.
Olligschlaeger, A. M., "Criminal Intelligence Databases and Applications", in Marilyn B. Peterson, Bob Morehouse, and Richard Wright, Intelligence 2000: Revising the Basic Elements—A Guide for Intelligence Professionals, 2000, a joint publication of IALEIA and LEIU, United States.
Tirkel, A., et al.; "Image Watermarking—A Spread Spectrum Application," Sep. 22-25, 1996.
Newton's Telecom Dictionary, 18th Edition, Feb. 2002, p. 168, section "coding theory".
Supplementary European Search Report for EP Application No. EP 04 80 9530, Munich, Germany, completed on Mar. 25, 2009.
International Search Report for International Application No. PCT/US04/025029, European Patent Office, Netherlands, mailed on Mar. 14, 2006.
Office Action mailed Dec. 1, 2011, in Canadian Patent Application No. 2,534,767, DSI-ITI, LLC, filed Aug. 4, 2004.
National Alliance of Gang Investigators Associations, 2005 National Gang Threat Assessment, 2005, pp. vi and 5-7, Bureau of Justice Assistance, Office of Justice Programs, U.S. Department of Justice.
Statement for the Record of John S. Pistole, Assistant Director, Counterterrorism Division, Federal Bureau of Investigation, Before the Senate Judiciary Committee, Subcommittee on Terrorism, Technology, and Homeland Security, Oct. 14, 2003.
Dye, Charles, "Oracle Distributed Systems," O'Reilly Media, Inc., Apr. 1, 1999.
McCollum, "Federal Prisoner Health Care Copayment Act of 2000," House of Representatives Report 106-851, 106th Congress 2d Session, Sep. 14, 2000.
Fischer, Alan D., "COPLINK nabs criminals faster," Arizona Daily Star, Jan. 7, 2001.
Wilkinson, Reginald A., "Visiting in Prison," Prison and Jail Administration's Practices and Theory, 1999.
i2 Investigative Analysis Software; "i2 TextChart—Text Visualized", URL: http://www.i2.co.uk/Products/i2TextChart/. Jun. 13, 2005.
i2 Investigative Analysis Software; "iBase—Information Captured", URL: http://www.i2.co.uk/Products/iBase/. Jun. 13, 2005.
i2 Investigative Analysis Software; "iBridge", URL: http://www.i2.eo.uk/Products/iBridge/. Jun. 13, 2005.
i2 Investigative Analysis Software; "Chart Reader", URL: http://www.i2.eo.uk/Products/Chart Reader. Jun. 13, 2005.
i2 Investigative Analysis Software; "Pattern Tracer", URL: http://www.i2.co.uk/Products/Pattern Tracer/. Jun. 13, 2005.
i2 Investigative Analysis Software; "Prisons", URL: http://www.i2.co.uk/Solutions/Prisons/default.aso. Jun. 13, 2005.
i2 Investigative Analysis Software; "Setting International Standards for Investigative Analysis", URL: htto://www.i2.co.uk/Products/index.htm. Jun. 13, 2005.
Microsoft White Paper: "Integrated Justice Information Systems", retrieved from Microsoft Justice & Public Safety Solutions (Nov. 5, 2002) [http://jps.directtaps.net_vtibin/owssvr.dll?Using=Default%2ehtm] 22 pages.
IMAGIS Technologies, Inc. "Computer Arrest and Booking System", [retrieved from http://www.imagistechnologies.com/Product/CABS.htm] (Nov. 5, 2002) 5 pages.
I MAGIS Technologies, Inc. "Integrated Justice System—Web-based Image and Data Sharing", [retrieved from http://www.imagistechnologies.com/Product/IJISFramework.htm] (Nov. 5, 2002) 4 pages.
O'Harrow, Robert Jr.. "U.S. Backs Florida's New Counterterrorism Database; 'Matrix' Offers Law Agencies Faster Access to Americans' Personal Records"; The Washington Post. Washington, D.C.: Aug. 6, 2003. p. A. 01.
O'Harrow, Robert Jr.. "Database will make tracking suspected terrorists easier" The Dallas Morning News. Dallas, TX: Aug. 6, 2003. p. 7A.
Article entitled "Co Plink: A Case of Intelligent Analysis and Knowledge Management," by Hauck et al., published in 1999.
Article entitled "Building an Infrastructure for Law Enforcement Information Sharing and Collaboration: Design Issues and Challenges," by Chau et al., published in 2001.
Coden, A. R. and Brown, E. W., "Speech Transcript Analysis for Automatic Search," Proceedings of the 34th Hawaii International Conference on System Sciences, IEEE, United States (2001).
State of North Carolina Department of Correction RFP #ITS-000938A, issued May 25, 2004.
Christel, M., et al., "Interactive Maps for a Digital Video Library," IEEE Special Edition on Multimedia Computing, Jan.-Mar. 2000, pp. 60-67, IEEE, United States.
Lane, I., et al., Language Model Switching Based on Topic Detection for Dialog Speech Recognition, Proceedings IEEE-ICASSP, vol. 1, pp. 616-619, 2003, IEEE, United States.

(56) References Cited

OTHER PUBLICATIONS

Office of the Inspector General, Department of Justice, "Criminal Calls: A Review of the Bureau of Prisons' Management of Inmate Telephone Privileges," Chapter 4, 1999, United States.
National Major Gang Taskforce, A Study of Gangs and Security Threat Groups in America's Adult Prisons and Jails, 2002, United States.
Coherent Announces Industry's First Remote Management System for Echo Canceller, Business Wire, Mar. 3, 1997.
Frankel, E., Audioconferencing Options (Teleconferencing Units, Conference Bridges and Service Bureaus), includes related articles on speech processing and new conferencing technology, Teleconnect, vol. 4, No. 5, p. 131(3), May 1996.
Silberg, L., Digital on Call, HFN the Weekly Newspaper for the Home Furnishing Network, p. 197, Mar. 17, 1997.
Inmate Telephone Services: Large Business: Voice, Oct. 2, 2001.
"Cisco IAD2400 Series Business-Class Integrated Access Device", Cisco Systems Datasheet, 2003.
"Cisco IAD2420 Series Integrated Access Devices Software Guide—Initial Configuration," Cisco Systems, accessed Sep. 23, 2014, accessible at http://www.cisco.com/en/US/docs/routers/access/2400/2420/software/configuration/guide/init_cf.html.
"Hong Kong: Prison Conditions in 1997," Human Rights Watch, Mar. 1, 1997, C905, available at http://www.refworld.org/docid/3ae6a7d014.html, accessed May 29, 2014.
"Service-Observing Arrangements Using Key Equipment for Telephone Company Business Offices, Description and Use," Pac. Tel. & Tel. Co., Bell System Practices, Station Operations Manual, Section C71.090, Issue A, 1-1-57-N (1957).
"SIP and IPLinkTM in the Next Generation Network: An Overview," Intel, 2001.
"Voice Over Packet in Next Generation Networks: An Architecture Framework," Bellcore, Special Report SR-4717, Issue 1, Jan. 1999.
"Cool Edit Pro, Version 1.2 User Guide," Syntrillium Software Corporation, 1998.
"Criminal Calls: A Review of the Bureau of Prisons' Management of Inmate Telephone Privileges," U.S. Department of Justice, Office of the Inspector General, Aug. 1999.
"Global Call API for Linux and Windows Operating Systems," Intel Dialogic Library Reference, Dec. 2005. (3 parts).
"The NIST Year 2002 Speaker Recognition Evaluation Plan," NIST, Feb. 27, 2002, accessible at http://www.itl.nist.gov/iad/mig/tests/spk/2002/2002-spkrecevalplan-v60.pdf.
Aggarwal, et al., "An Environment for Studying Switching System Software Architecture," IEEE, Global Telecommunications Conference, 1988.
Auckenthaler, et al., "Speaker-Centric Score Normalization and Time Pattern Analysis for Continuous Speaker Verification," International Conference on Acoustics, Speech, and Signal Processing (ICASSP), vol. 2, Jun. 2000, pp. 1065-1068.
Audacity Team, "About Audacity;" World Wide Web, 2014, accessible at http://wiki.audacity.team.org/wiki/About_Audacity.
Beek et al., "An Assessment of the Technology of Automatic Speech Recognition for Military Applications," IEEE Trans. Acoustics, Speech, and Signal Processing, vol. ASSP-25, No. 4, pp. 310-322 (1977).
Beigi, et al., "A Hierarchical Approach to Large-Scale Speaker Recognition," EuroSpeech 1999, Sep. 1999, vol. 5; pp. 2203-2206.
Beigi, et al., "IBM Model-Based and Frame-By-Frame Speaker-Recognition," Speaker Recognition and its Commercial and Forensic Applications, Apr. 1998; pp. 1-4.
Beigi, H., "Challenges of Large-Scale Speaker Recognition," 3rd European Cooperation in the Field of Scientific and Technical Research Conference, Nov. 4, 2005.
Boersa, et al., "Praat: Doing Phonetics by computer," World Wide Web, 2015, accessible at http://www.fon.hum.uva.nl/praat.
Bolton, et al., "Statistical Fraud Detection: A Review," Statistical Science, vol. 17, No. 3 (2002), pp. 235-255.
BubbleLINK ® Software Architecture (Science Dynamics 2003).

Bur Goode, Voice Over Internet Protocol (VoIP), Proceedings of the IEEE, vol. 90, No. 9, 1495-1517 (Sep. 2002).
Carey, et al., "User Validation for Mobile Telephones," International Conference on Acoustics, Speech, and Signal Processing (ICASSP), vol. 2, Jun. 2000, pp. 1093-1096.
Chaudhari, et al., "Transformation enhanced multi-grained modeling for text-independent speaker recognition," International Conference on Spoken Language Processing, 2000, pp. 298-301.
Clavel, et al., "Events Detection for an Audio-Based Surveillance System," IEEE International Conference on Multimedia and Expo (ICME2005), Jul. 6-8, 2005, pp. 1306-1309.
Clifford J. Weinstein, MIT, The Experimantal Integrated Switched Network—A System-Level Network Test Facility (IEEE 1983).
Commander Call Control System, Rev. 1.04 (Science Dynamics 2002).
Complaint for Patent Infringement, filed Aug. 1, 2013, Securus Technologies, Inc. v. Global Tel*Link Corporation, Case No. 3:13-cv-03009-K (N.D. Tex.).
Final Office Action, mailed Jun. 1, 2011, in U.S. Appl. No. 11/819,834, filed Jun. 29, 2007, 26 pages.
Final Office Action, mailed Oct. 17, 2011, in U.S. Appl. No. 11/706,431, filed Feb. 15, 2007, 13 pages.
Non-Final Office Action, mailed Sep. 22, 2010, in U.S. Appl. No. 11/819,834, filed Jun. 29, 2007, 23 pages.
Corbató et al., "Introduction and Overview of the MULTICS System," Proceedings—Fall Joint Computer Conference, 1965.
Defendant's Opening Claim Construction Brief, Global Tel*Link Corporation v. Securus Technologies, Inc., Case No. 3:14-cv-0829-K (N.D. Tex.), filed Nov. 19, 2014.
Defendant's Responsive Claim Construction Brief, Global Tel*Link Corporation v. Securus Technologies, Inc., Case No. 3:14-cv-0829-K (N.D. Tex.), filed Dec. 10, 2014.
Definitions of "Local Area Network (LAN)" and "Wide Area Network (WAN)," Microsoft Computer Dictionary (Microsoft Press 2002), pp. 304 and 561.
Digital "Bellcore Notes on the Networks," Bellcore, Special Report SR-2275, Issue 3, Dec. 1997.
Dunn, et al., "Approaches to speaker detection and tracking in conversational speech," Digital Signal Processing, vol. 10, 2000; pp. 92-112.
File History of U.S. Pat. No. 8,135,115, U.S. Appl. No. 11/603,938, filed Nov. 22, 2006.
File History of U.S. Pat. No. 8,577,003, U.S. Appl. No. 13/009,483, filed Jan. 19, 2011.
File History of U.S. Pat. No. 8,886,663, U.S. Appl. No. 12/284,450, filed Sep. 20, 2008. (2 parts).
Fox, B., "The First Amendment Rights of Prisoners," 63 J. Crim. L. Criminology & Police Sci. 162 (1972).
Furui, et al., "Experimental studies in a new automatic speaker verification system using telephone speech," Acoustics, Speech, and Signal Processing, IEEE International Conference on ICASSP '80, vol. 5, Apr. 1980, pp. 1060-1062.
Furui, S., "50 Years of Progress in Speech and Speaker Recognition Research," ECTI Transactions on Computer and Information Technology, vol. 1, No. 2, Nov. 2005, pp. 64-74.
Hansen, et al., "Speaker recognition using phoneme-specific gmms," The Speaker and Language Recognition Workshop, May-Jun. 2004.
IEEE 100: The Authoritative Dictionary of IEEE Standard Terms, Seventh Edition, Standards Information Network, IEEE Press (2000).
Isobe, et al., "A new cohort normalization using local acoustic information for speaker verification," Proceedings of the IEEE International Conference on Acoustics, Speech, and Signal Processing, vol. 2, Mar. 1999; pp. 841-844.
Jeff Hewett and Lee Dryburgh, Signaling System No. 7 (SS7/C7): Protocol, Architecture, and Services (Networking Technology) at 85 (Cisco Press, Jun. 2005).
Joint Claim Construction and Prehearing Statement, Exhibit B: Securus' Intrinsic and Extrinsic Evidence Charts, Global Tel*Link Corporation v. Securus Technologies, Inc., No. 3:14-cv-00829-K (N.D. Tex.), Sep. 26, 2014.

(56) References Cited

OTHER PUBLICATIONS

Juang, et al., "Automatic Speech Recognition—A Brief History of the Technology Development," Oct. 8, 2014.
Kinnunen, et al., "Real-Time Speaker Identification and Verification," IEEE Transactions on Audio, Speech, and Language Processing, vol. 14, No. 1, Jan. 2006, pp. 277-288.
Maes, et al., "Conversational speech biometrics," E-Commerce Agents, Marketplace Solutions, Security Issues, and Supply and Demand, Springer-Verlang, London, UK, 2001, pp. 166-179.
Maes, et al., "Open SESAME! Speech, Password or Key to Secure Your Door?," Asian Conference on Computer Vision, Jan. 1998; pp. 1-3.
Matsui, et al., "Concatenated Phoneme Models for Text-Variable Speaker Recognition," International Conference on Acoustics, Speech, and Signal Processing (ICASSP), vol. 2, Apr. 1993; pp. 391-394.
Microsoft Computer Dictionary, Fifth Edition, Microsoft Computer Press: Redmond, WA, 2002.
Office action mailed Mar. 30, 2011 in U.S. Appl. No. 11/706,431.
Original Specification as-filed Aug. 26, 2005, in U.S. Appl. No. 11/212,495 to Frost.
Original Specification as-filed Jul. 22, 2005, in U.S. Appl. No. 11/187,423 to Shaffer.
Osifchin, N., "A Telecommunications Buildings/Power Infrastructure in a New Era of Public Networking," IEEE 2000.
PacketCableTM 1.0 Architecture Framework Technical Report, PKT-TR-ARCH-V0 1-001201 (Cable Television Laboratories, Inc. 1999).
Pages from http://www.corp.att.com/history, archived by web.archive.org on Nov. 4, 2013.
Pelecanos, J. "Conversational biometrics," in Biometric Consortium Meeting, Baltimore, MD, Sep. 2006, accessible at http://www.biometrics.org/bc2006/presentations/Thu_Sep_21/Session_I/Pelecanos_Conversational_Biometrics.pdf.
Pollack, et al., "On the identification of Speakers by Voice," The Journal of the Acoustical Society of America, vol. 26, No. 3, May 1954.
Prosecution History of International Patent Application No. PCT/US99/09493 by Brown et al.
Prosecution History of U.S. Appl. No. 09/072,436, filed May 4, 1998.
Prosecution History of U.S. Appl. No. 11/005,816, filed Dec. 7, 2004.
Prosecution History of U.S. Appl. No. 11/045,589, filed Jan. 28, 2005.
Prosecution History of U.S. Appl. No. 11/182,625, filed Jul. 15, 2005.
Prosecution History of U.S. Appl. No. 11/479,990, filed Jun. 30, 2006.
Prosecution History of U.S. Appl. No. 11/480,258, filed Jun. 30, 2006.
Prosecution History of U.S. Appl. No. 11/609,397, filed Dec. 12, 2006.
Prosecution History of U.S. Appl. No. 12/002,507, filed Dec. 17, 2007.
Rey, R.F., ed., "Engineering and Operations in the Bell System," 2nd Edition, AT&T Bell Laboratories: Murray Hill, NJ, 1983.
Reynolds, D., "Automatic Speaker Recognition Using Gaussian Mixture Speaker Models," The Lincoln Laboratory Journal, vol. 8, No. 2, 1995; pp. 173-192.
Rosenberg, et al., "The Use of Cohort Normalized Scores for Speaker Verification," Speech Research Department, AT&T Bell Laboratories, 2nd International Conference on Spoken Language Processing, Banff, Alberta, Canada, Oct. 12-16, 1992.
Ross, et al., "Multimodal Biometics: An Overview," Proc. of 12th European Signal Processing Conference (EUSIPCO), Vienna, Austria, Sep. 2004, pp. 1221-1224.
Science Dynamics, Inmate Telephone Control Systems, http://scidyn.com/fraudprev_main.htm. (archived by web.archive.org on Jan. 12, 2001).
Science Dynamics, SciDyn BubbleLINK, http://www.scidyn.com/products/bubble.html (archived by web.archive.org on Jun. 18, 2006).
Science Dynamics, SciDyn Call Control Solutions: Commander II, http://www.scidyn.com/products/commander2.html (archived by web.archive.org on Jun. 18, 2006).
Science Dynamics, SciDyn IP Gateways, http://scidyn.com/products/ipgateways.html (archived by web.archive.org on Jun. 15, 2001).
Science Dynamics, Science Dynamics—IP Telephony, http://www.scidyn.com/iptelephony_main.htm (archived by web.archive.org on Oct. 12, 2000).
Shearme, et al., "An Experiment Concerning the Recognition of Voices," Language and Speech, vol. 2, No. 3, Jul./Sep. 1959.
Silberschatz, et al., Operating System Concepts, Third Edition, Addison-Wesley: Reading, MA, Sep. 1991.
Simmons, R., "Why 2007 is Not Like 1984: A Broader Perspective on Technology's Effect on Privacy and Fourth Amendment Jurisprudence," 97 J. Crim. L. & Criminology 531(2006-2007).
Smith, Megan J., "Corrections Turns Over a New LEAF: Correctional Agencies Receive Assitance From the Law Enforcement Analysis Facility," Corrections Today, Oct. 1, 2001.
Specification of U.S. Appl. No. 10/720,848, "Information Management and Movement System and Method," to Viola, et al., filed Nov. 24, 2003.
Sunstrom, K., "Voice over IP: An Engineering Analysis," Master's Thesis, Department of Electrical and Computer Engineering, University of Manitoba, Sep. 1999.
Tanenbaum, A., Modern Operating System, Third Edition, Peason Prentice Hall: London, 2009.
U.S. Appl. No. 60/607,447, "IP-based telephony system and method," to Apple, et al., filed Sep. 3, 2004.
Viswanathan, et al., "Multimedia Document Retrieval using Speech and Speaker Recognition," International Journal on Document Analysis and Recognition, Jun. 2000, vol. 2; pp. 1-24.
Walden, R., "Performance Trends for Analog-to-Digital Converters," IEEE Communications Magazine, Feb. 1999.
Final Office Action directed to related U.S. Appl. No. 12/032,200, mailed Nov. 28, 2011; 26 pages.
Non-Final Office Action directed to related U.S. Appl. No. 12/032,220, mailed May 3, 2011; 27 pages.
Notice of Allowance directed to related U.S. Appl. No. 12/032,200, mailed Jan. 10, 2014; 12 pages.
Definitions of "suspicion" and "suspect", American Heritage Dictionary, 4th Edition, New York: Houghton Mifflin, 2006; pp. 1743-1744.
Investigative Analysis Software webpage titled "i2 TextChart, Text Visualized", published by the Visual Space, available at www.i2.co.uk/products/i2TextChart/, accessed Jun. 13, 2005; 2 pages.
U.S. Appl. No. 12/284,450, "Multi-Party Conversation Analyzer and Logger," to Gainsboro et al., filed Sep. 20, 2008; 47 pages.
Definition of "constantly", The American Heritage College Dictionary, 4th Ed. (2002); p. 306.
Doddington, G., "Speaker Recognition based on Idiolectal Differences between Speakers," 7th European Conference on Speech Communication and Technology, Sep. 3-7, 2001; 4 pages.
Navratil, et al., "A Speech Biometrics System With MultiGrained Speaker Modeling," 2000; 5 pages.
Navratil, et al., "Phonetic speaker recognition using maximum-likelihood brinary-decision tree models," Proceedings of the IEEE International Conference on Aucostics, Speech, and Signal Processing, Apr. 6-10, 2003; 4 pages.
Zajic, et al., "A Cohort Methods for Score Normalization in Speaker Verification System, Acceleration of On-Line Cohort Methods," Proceedings of the 12th International Conference "Speech and Computer," Oct. 15-18, 2007; 6 pages.
Moattar, et al., "Speech Overlap Detection using Spectral Features and its Application in Speech Indexing," 2nd International Conference on Information & Communication Technologies, 2006; pp. 1270-1274.

(56) References Cited

OTHER PUBLICATIONS

Beigi, H., "Decision Theory," Fundamentals of Speaker Recognition, Ch. 9, Springer, US 2011; pp. 313-339.

* cited by examiner

SYSTEM AND METHOD FOR MULTI-MODAL AUDIO MINING OF TELEPHONE CONVERSATIONS

CROSS-REFERENCE TO RELATED APPLICATIONS

This application is a continuation application of U.S. application Ser. No. 12/032,200, filed Feb. 15, 2008, which claims the benefit of U.S. Provisional Application No. 60/901,342, filed Feb. 15, 2007, all of which are incorporated by reference herein in their entirety.

BACKGROUND OF THE INVENTION a. Field of the Invention

This invention relates generally to telephony, and more particularly to a method and system for automatically monitoring and retrieving the content of telephone calls.

b. Background Art

There is a general need for systems that automatically monitor the contents of telephone conversations. There is also a general need for methods that analyze the contents of monitored telephone conversations for a plurality of characteristics such as, for example, topics, phrases (e.g., the use of slang suggesting inappropriate behavior or criminal activity), or evidence of the addition of third parties so that the calls may later be retrieved on the basis of these characteristics.

Although most correctional facilities record all telephone calls made by inmates, it is believed that only a very small proportion of the calls is monitored by correctional officers. Many correctional facilities record 2,000 inmate telephone calls a day, such that monitoring all telephone calls, or even a large fraction of all calls, on a regular basis would require too much personnel and would be cost prohibitive. Inmates are aware of this and know that there is little chance that any one particular conversation will be monitored. Thus, it is thought that inmates may use telephone calls to engage in inappropriate conduct or criminal behavior while incarcerated.

Research has shown that inmate telephone recordings often contain evidence of inappropriate or illegal activity, such as terrorist activity, the intelligence value of which is not fully exploited by correctional facilities. This may result in the loss of potentially valuable information that may help solve or prevent additional crimes. For example, it has been shown that inmates may use telephones to inappropriately contact witnesses, make drug deals, discuss gang related issues, and in general continue to exert criminal influence on the very communities in which they were convicted. Inmates may also discuss issues related to non-criminal activities that are of interest to correctional officers, including suicidal thoughts or tendencies, medical or psychological problems, and political or religious radicalization.

Patterns of inappropriate or criminal activity may not always be readily apparent from a single telephone conversation. Rather, patterns may only appear when information from multiple conversations is combined, for example from a single inmate or multiple inmates, from a single correctional facility or multiple correctional facilities, or a combination thereof. Thus, even if all inmate telephone conversations at all correctional facilities were to be monitored, some patterns might still not be recognized unless the same individual monitors all conversations. Doing so would be physically impossible at most correctional facilities.

From an investigative viewpoint, as well as from strategic and tactical intelligence viewpoints, it is also desirable, whenever possible, to combine data from multiple sources, such as inmate telephone systems, inmate management systems, and investigative case management systems. Each source of information may provide additional insight into patterns of inmate activity, and may also assist in establishing evidence of inappropriate or criminal activity.

In certain cases it is imperative that correctional officials are notified as soon as possible when an inmate discusses a specific topic. This is especially true for instances where threats of death, violence, destruction, or suicide are uttered during conversations. The sooner law enforcement or intelligence officials become aware of these threats, the greater the chances that they can prevent individuals from corning to harm.

It is also well established that it is of advantage to view data in multiple formats, or modes. This is especially true in instances where a query results in large amounts of data. For example, in addition to tabular representations of data, data might also be viewed on a map, a link chart, or a timeline chart. Each mode of visualization can provide additional insight into any patterns evident in the data that other modes of visualization may not provide.

BRIEF SUMMARY OF THE INVENTION

It is therefore desirable to be able to automate the monitoring of inmate telephone calls and provide correctional facilities with the ability to search for and retrieve telephone calls that contain potential evidence of inappropriate conduct or illegal activity.

It is also desirable to be able to go directly to the point in the conversation where the inappropriate conduct or illegal activity was discussed without having to listen to the entire conversation.

In addition, it is desirable to provide correctional officers with the ability to search for and retrieve telephone calls in multiple modes, i.e. query from and display on multiple modes of visualization and analytical techniques. Multi-modal queries and analytical techniques assist in identifying patterns across calls and correctional facilities.

It is also desirable to combine data from multiple sources and/or multiple correctional facilities to provide further insight into patterns of inappropriate conduct or criminal activity and assist in establishing evidence of inappropriate conduct or criminal activity that a single source of information may not reveal.

Also, it is desirable to provide a means with which correctional officials can instruct the monitoring system to immediately notify them when certain preset or user defined characteristics are detected in a telephone conversation.

The present invention provides a method and a system for the automated monitoring of inmate telephone conversations as well as multi-modal search, retrieval and playback capabilities for the monitored telephone conversations. A general term for such capabilities is multi-modal audio mining. The invention is designed to provide an efficient means for organizations such as correctional facilities to identify and monitor the contents of telephone conversations and to provide evidence of possible inappropriate conduct or criminal activity of inmates in instances where such activity indeed occurs.

Disclosed herein is a system for data-mining a monitored telephone conversation. The system generally includes a speech recognition processor configured to transcribe the monitored telephone conversation and associate a plurality of characteristics of the monitored telephone conversation with a transcript of the monitored telephone conversation; an event detection processor configured to analyze the monitored telephone conversation to detect one or more events within the monitored telephone conversation; a tagging processor configured to associate metadata information indicative of the detected one or more events with the transcript of the monitored telephone conversation; and a multimedia data warehouse configured to store at least the transcript of the monitored telephone conversation and the metadata information and characteristics associated therewith as a data record for the monitored telephone conversation. The system may also include a data normalization processor configured to atomize the data record for the monitored telephone conversation with respect to a plurality of data records stored within the multimedia data warehouse and a link creation processor configured to create one or more logical links between the data record for the monitored telephone conversation and one or more of the plurality of data records stored within the multimedia data warehouse. In addition, an optional synchronization processor may associate timing information for the detected one or more events with a sound recording of at least a portion of the conversation or position information (e.g., word or character counts) for the detected one or more events with the transcript of the monitored telephone conversation).

In some embodiments of the invention, the data record may include a sound recording of at least a portion of the monitored telephone conversation. Alternatively, a sound recording of at least a portion of the monitored telephone conversation may be stored in a sound recording database, and a reference thereto may be stored in the multimedia data warehouse as part of the data record.

The speech recognition processor will typically utilize at least one domain-specific language model to transcribe the monitored telephone conversation, for example a language model that is domain-specific to inmate speech. It is also contemplated that the language model or models may be domain specific to a plurality of regional dialects, a plurality of ethnic groups, or a plurality of languages.

The event detection processor may include a three-way call detection processor configured to analyze the plurality of characteristics for an indication of a third party being added to the monitored telephone conversation.

The event detection processor typically also includes an entity identification processor configured to analyze at least the transcript of the monitored telephone conversation to identify one or more entities mentioned during the monitored telephone conversation. At least one entity database may be coupled to the event detection processor. The at least one entity database may include at least one domain-specific Hidden Markov Model, such as a Hidden Markov Model domain-specific to inmate speech. The Hidden Markov Model or Models may also be domain-specific to a plurality of regional dialects, a plurality of ethnic groups, or a plurality of language. Further, it is contemplated that the Hidden Markov Models may be configured to utilize trigrammatic word transitional probabilities, bigrammatic word transitional probabilities, or both.

The event detection processor may utilize any suitable algorithm to identify one or more entities mentioned during the monitored telephone conversation. For example, the entity identification processor may utilize one or more Viterbi search or string matching algorithms to search the at least one entity database. Alternatively, the entity identification processor may use one or more heuristic algorithms to heuristically identify one or more entities mentioned during the monitored telephone conversation.

The event detection processor may also include a topic detection processor configured to analyze at least the transcript of the monitored telephone conversation to identify one or more topics discussed during the monitored telephone conversation. At least one topic database may be coupled to the topic detection processor. The topic detection processor may utilize one or more text clustering or phrase-matching algorithms to search the at least one topic database in order to identify one or more topics discussed during the monitored telephone conversation. Optionally, the topic detection processor may be configured to perform automatic topic annotation of the conversation using at least one domain-specific Hidden Markov Model and at least one domain-specific topic language model stored in the at least one topic database. As with other domain-specific aspects of the invention, the Hidden Markov Model and the topic language model used for topic detection may be domain-specific to inmate speech or to one or more ethnic groups, regional dialects, languages, or other linguistic differences, and the Hidden Markov Model may utilize either or both of trigrammatic and bigrammatic transitional word probabilities.

In some embodiments of the invention, at least one of a spatial information database and a telephone subscriber information database is coupled to the event detection processor. The event detection processor may be configured to associate information retrieved from at least one of the spatial information database and the telephone subscriber information database with at least the transcript of the monitored telephone conversation based upon the one or more events detected within the monitored telephone conversation.

A multi-modal query interface configured to accept user-specified search criteria may also be included. A search processor may be configured to search the multimedia data warehouse and retrieve one or more data records meeting the user-specified search criteria, and a multi-modal output interface may be configured to display the retrieved one or more data records. In other embodiments of the invention, a monitoring processor is configured to monitor the multimedia data warehouse for addition of a data record matching the user-specified search criteria. A notification processor may then notify a user upon addition of the data record meeting the user-specified search criteria.

Also disclosed is a system for data-mining a monitored telephone conversation, including: a multimedia data warehouse configured to store a plurality of data records, each of the data records associated with a monitored telephone conversation; a data transformation processor configured to receive data from at least one data source, the received data including at least audio of a monitored telephone conversation and metadata information regarding the monitored telephone conversation; a data augmentation processor configured to augment the received data with data retrieved from one or more of a telephone subscriber database and a spatial information database; a speech recognition processor configured to transcribe the monitored telephone conversation and associate a plurality of characteristics of the monitored telephone conversation with a transcript of the monitored telephone conversation; and a data mapping processor configured to store a data record for the monitored telephone conversation to the multimedia data warehouse, the data record including at least the transcript of the monitored telephone conversation, the plurality of characteristics of the monitored telephone conversation, the metadata information regarding the monitored telephone conversation, and the retrieved data. The system optionally includes a data cleaning processor configured to clean the received data, and, in some embodiments, to verify the suitability of the received data for further processing.

An optional data normalization processor is configured to atomize the data record for the monitored telephone conversation with respect to the multimedia data warehouse, while an optional link creation processor is configured to create one or more logical links between the data record for the monitored telephone conversation and one or more data records within the multimedia data warehouse. The data normalization processor may use a fuzzy logic algorithm, a matching algorithm (e.g., a soundex algorithm), a natural language processing algorithm, or another suitable algorithm to atomize the data record with respect to the multimedia data warehouse.

The at least one data source will typically include an inmate telephone system (e.g., a system for monitoring and recording inmate telephone calls, typically from a single correctional institution). The at least one data source may also include an inmate management system and/or an investigative case management system. Further, the at least one data source may originate from a single correctional facility or a plurality of correctional facilities.

The invention also provides a method of data-mining a monitored telephone conversation including the following steps: transcribing a monitored telephone conversation; extracting a plurality of characteristics of the monitored telephone conversation; associating the extracted plurality of characteristics of the monitored telephone conversation with a transcript of the monitored telephone conversation; analyzing the monitored telephone conversation to detect one or more events within the monitored telephone conversation; associating metadata information indicative of the detected one or more events with the transcript of the monitored telephone conversation; and storing at least the transcript of the monitored telephone conversation and the characteristics and metadata information associated therewith in a multimedia data warehouse as a data record for the monitored telephone conversation. The method optionally further includes: atomizing the data record for the monitored telephone conversation with respect to a plurality of data records stored within the multimedia data warehouse; and creating one or more logical links between the data record for the monitored telephone conversation and one or more of the plurality of data records stored within the multimedia data warehouse. Atomicity may be ensured by using any of a number of suitable algorithms, including, without limitation, fuzzy logic algorithms, matching algorithms (e.g., soundex algorithms), and natural language processing algorithms. The detection of events may include detecting the addition of one or more third parties to the conversation, the discussion of one or more topics during the conversation, and/or the mention of one or more entities during the conversation.

In another aspect of the invention, a method of data-mining a monitored telephone conversation includes: receiving data from at least one data source, the received data including at least audio of a monitored telephone conversation and metadata information regarding the monitored telephone conversation; retrieving data from one or more of a telephone subscriber database and a spatial information database based upon the metadata information regarding the monitored telephone conversation; associating the retrieved data with the received data; transcribing the monitored telephone conversation; extracting a plurality of characteristics of the monitored telephone conversation; associating the extracted plurality of characteristics of the monitored telephone conversation with a transcript of the monitored telephone conversation; generating a data record for the monitored telephone conversation, the data record including at least the transcript of the monitored telephone conversation, the plurality of characteristics of the monitored telephone conversation, the metadata information regarding the monitored telephone conversation, and the retrieved data; and storing the data record for the monitored telephone conversation to a multimedia data warehouse. The method may also include cleaning the received data. Cleaning the data may include one or more of the following steps: stripping leading blanks from the audio of the monitored telephone conversation, stripping trailing blanks from the audio of the monitored telephone conversation, standardizing telephone numbers within the metadata information regarding the monitored telephone conversation, spell-checking names within the metadata information regarding the monitored telephone conversation, verifying suitability of the received data for further processing, and any combinations thereof.

An advantage of the present invention is that it operates independently of any particular type of telephone system, such as VOIP or POTS.

Another advantage of the present invention is that it works with any external data source that utilizes an open database architecture standard.

Still another advantage of the present invention is that it allows correctional officers, intelligence analysts, and other Officials to concentrate their efforts on analysis rather than data collection and transformation. The data is always available in the format that it is needed and when it is needed.

A further advantage of the present invention is that it allows correctional officers to perform multiple modes of analysis and visualization within a single system.

Another advantage of the present invention is that it permits correctional officers to search for and retrieve telephone conversations on the basis of topics discussed without having to know the exact words that were uttered.

Yet another advantage of the present system is that it permits one to "jump" directly to the point in the telephone conversation where the search criteria were found without having to listen to the entire telephone conversation.

Another advantage of the present invention is that the monitoring of telephone conversations is fully automated, thus resulting in considerable manpower savings.

Still another advantage of the present invention is that it allows correctional officers to be automatically notified as soon as a telephone conversation meeting preset or user-defined criteria is monitored, which may prevent a crime from occurring or a person from coming in harms way.

Yet a further advantage of the present invention is that it allows for the analysis of patterns of telephone conversations across multiple correctional facilities.

The foregoing and other aspects, features, details, utilities and advantages of the present invention will be apparent from reading the following description and claims, and from reviewing the accompanying drawings.

DETAILED DESCRIPTION OF THE INVENTION

The following description illustrates the invention with reference to a real world domain, and in particular with respect to correctional facilities. However, it should be understood that the practice of the invention is not limited to any particular domain or application. Rather, it is intended to be more generally applicable to any domain where there is a need for the automated monitoring and multi-modal query and retrieval of recorded or live telephone conversations.

The present invention allows users, such as law enforcement personnel, correctional officers, intelligence analysts, and investigators, to automatically monitor telephone conversations and search for evidence of inappropriate conduct, criminal activity, or other topics of discussion that should be brought to their attention. While prior art has typically focused on simple key word searches of transcripts of recorded telephone conversations, the present invention advantageously enables users to query, retrieve, visualize and analyze the contents of monitored telephone conversations (also referred to herein as "telephone conversations," "conversations," or simply "calls") in a plurality of modalities, as well as across a plurality of correctional facilities. Further, the present invention provides the ability to integrate other data known about persons, such as the inmates making the calls and called parties. Examples of such data include, without limitation, telephone subscriber identity, addresses, and type of service, records from inmate management systems, and data from investigative case management systems.

Figure 1:
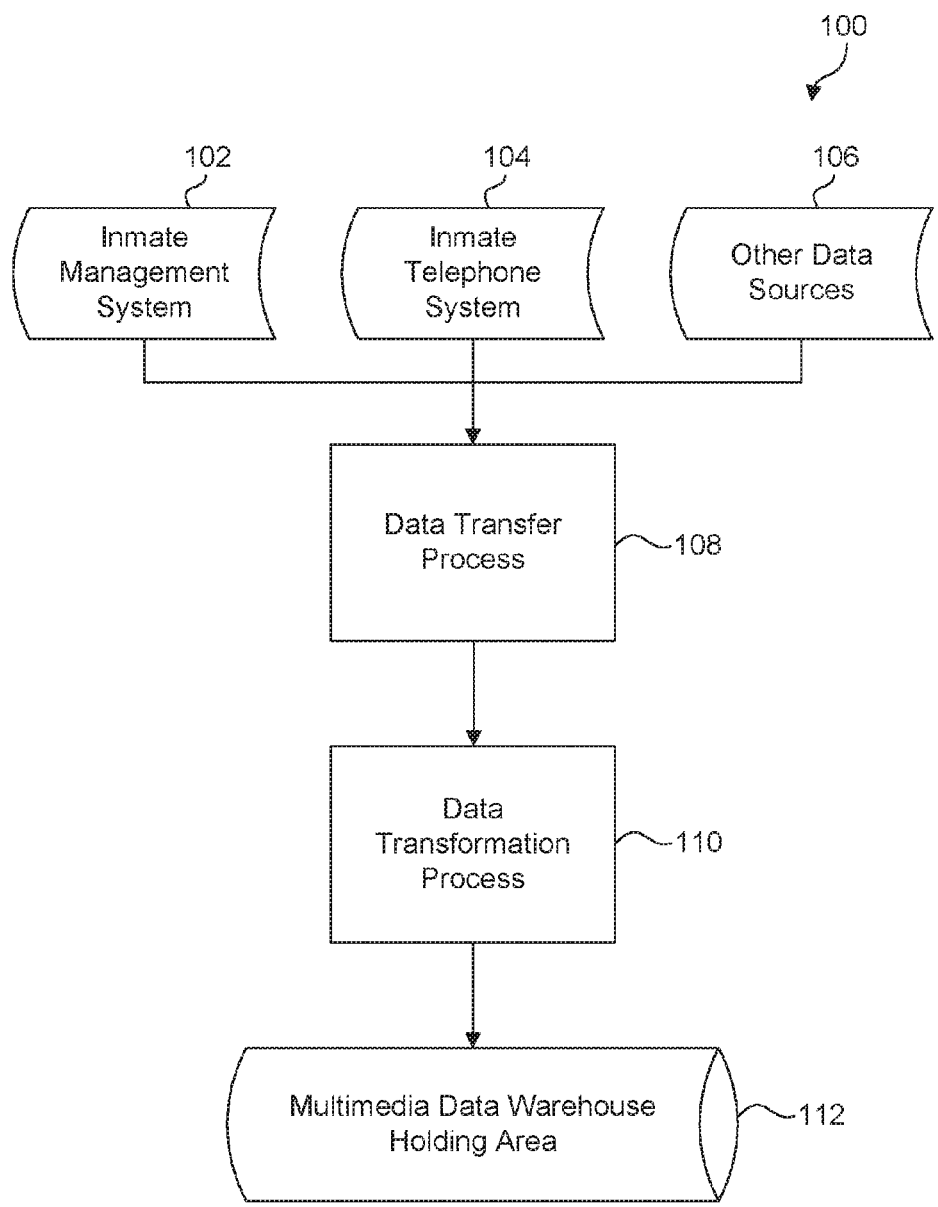
FIG. 1 is a block diagram illustrating a data transfer system according to an embodiment of the present invention.

FIG. 1 illustrates a block diagram of a data transfer system 100 according to an embodiment of the present invention. Data transfer system 100 may be software-implemented (e.g., a software program executed by one or more computer systems or processors), hardware-implemented (e.g., a series of instructions stored in one or more solid-state devices), or a combination of both. It should also be understood that multiple instances of the data transfer system may be simultaneously executed on a single computer or on multiple computers. The term "processor" as used herein refers to a computer microprocessor, and/or a software program (e.g., a software module or separate program) that is designed to be executed by one or more computer microprocessors running on one or more computer systems.

In FIG. 1, a data transfer process 108 receives data from at least one data source, such as external databases 102, 104, and 106, and forwards the received data to a data transformation process 110. One of ordinary skill in the art will appreciate that data transfer process 108 and data transformation process 110 may be implemented as separate processors or integrated into a single processor. Data transformation process 110 maps the received data to a temporary database schema and stores it for subsequent processing in a multimedia data warehouse holding area 112.

In some embodiments of the invention, the external databases include an inmate management system 102, an inmate telephone system 104, which preferably includes recorded, real-time, or near real-time audio of monitored inmate telephone conversations and information regarding the monitored telephone conversations, as well as a generic database containing other data sources 106 that might include, for example, an investigative case management system. It is contemplated, however, that the invention may be practiced with only a single data source that includes at least audio of a monitored telephone conversation and information regarding the monitored telephone conversation, such as the identity of the caller, the phone number called, the date and time of the call, and the duration of the call. For purposes of this application, and as one of ordinary skill will understand, an inmate telephone system is a telephone system that provides telephone services to the inmates for a corrections facility; typically, it contains hardware and software that is housed in the facility, but it may also be located at a remote site. Similarly, a inmate management system is a combination of hardware and software that permits a corrections facility to process and monitor its inmates. An inmate management system is typically separate from an inmate telephone system, but they may be electronically coupled to share information about inmates. As one of ordinary skill will appreciate, an investigative case management system is a combination of hardware and software that permits a user (typically a person who works in the corrections industry) to monitor the process and status of one or more individuals who have been processed at some time in a corrections facility.

The external databases 102, 104, 106 may reside on a single computer or multiple computers. Further, it is contemplated that a single database may be stored across multiple computers or storage devices. In addition, the external databases 102, 104, 106 may be provided by and processed from a plurality of correctional facilities. The data transfer process 108 may include stored procedures that run on the external databases 102, 104, 106, software programs that are executed on one or more computers and that access the external databases 102, 104, 106 remotely, or a combination of both.

In the multimedia data warehouse holding area 112, sound recordings (in whole or in part) of monitored telephone conversations received from the inmate telephone system 104 may be stored internally as binary large objects (BLOBs). Alternatively, sound recordings of monitored telephone conversations may be stored in an external file system in which case the multimedia data warehouse holding area 112 preferably includes a reference to the external file system.

Figure 2:
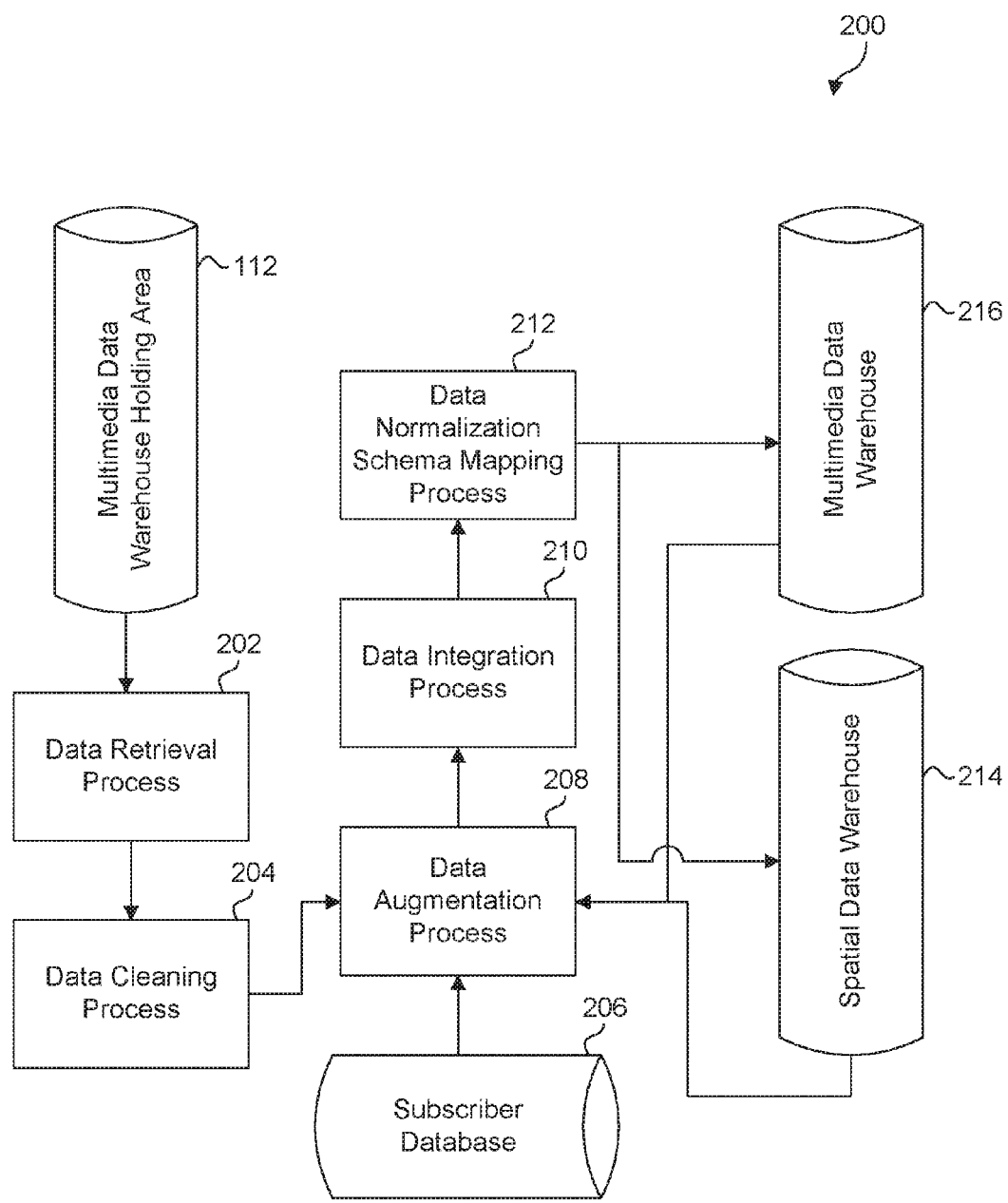
FIG. 2 is a block diagram illustrating a data cleaning, processing and mapping system according to an embodiment of the present invention.

FIG. 2 is a block diagram illustrating a data cleaning, processing and mapping system 200, which may be software-implemented (e.g., a software program executed by one or more computer systems or processors), hardware-implemented (e.g., a series of instructions stored in one or more solid-state devices), or a combination of both. It should also be understood that one or more instances of the data cleaning, processing and mapping system 200 may be executed simultaneously on one or more computers.

A data retrieval process 202 retrieves a record (e.g., the data received from databases 102, 104, 106) from the multimedia data warehouse holding area 112 and passes it to a data cleaning process 204. The data cleaning process 204 cleans the record (e.g., each element of the record) by performing a plurality of functions including, but not limited to, stripping leading and trailing blanks or non alphanumeric characters from strings; standardizing telephone numbers (e.g., the phone number called, which may be included in the information regarding the monitored telephone conversation); ensuring that a minimum number of elements are present in address records so that these records may later be processed for mapping; checking the spelling of first and last names (e.g., the first and last names of the inmate making the call, or the first and last names of the called party, which may be included in the information regarding the monitored telephone conversation); and flagging those records where the quality of individual data elements is so inadequate as to render the entire record unusable and unsuitable for further processing, in which case the record may be discarded in some embodiments of the invention.

After successful cleaning, the data record may be passed on to the data augmentation process 208. Wherever possible, the data augmentation process 208 adds further information to the data record in order to make it more useful for analytical purposes and to allow additional cross-referencing with other records. Typically, the data augmentation process 208 will utilize the received data, such as the information regarding the monitored telephone conversation, to retrieve data from one or more databases. For example, in FIG. 2 the data augmentation process is coupled to a telephone subscriber database 206 and a spatial information database 214. Thus, the received data may be augmented by retrieving subscriber information for telephone numbers from subscriber database 206 and spatial information, such as geographic coordinates for addresses corresponding to the telephone numbers called, from spatial data warehouse 214.

By augmenting the received data with the retrieved data, the ability of the present invention to query and display in multiple modalities (e.g., query and display on the basis of inmate name, dialed phone number, name of called party, address of called party, ZIP code of called party, police precinct of called party, and the like) is enhanced. For example, augmenting a land based telephone number of a called party with subscriber information (e.g., name of subscriber and type of service) and address information allows the location of the telephone number to be displayed on a map and queried based on location. The data augmentation process is illustrated in more detail in FIG. 3, which is further discussed below.

Next the record may be passed to the data integration process 210. The data integration process performs a final check to ensure that each element of a record (e.g., the received data and the retrieved data) can readily be integrated with a plurality of application specific data warehouse schemas. It should be understood that the term "application specific data warehouse" refers to data warehouses that are specialized in certain applications, such as a spatial data warehouse that stores data used by geographic information systems. By using a plurality of application specific data warehouses, the present invention is better able to provide multiple modalities for query and visualization of results.

A data normalization and schema mapping process 212 maps each data element within the data record to the plurality of application specific data warehouses and ensures that each entity (e.g., address, person, organization, telephone number) is only represented once within the plurality of application specific data warehouses (referred to herein as atomization and/or atomicity). Each record or element of a record may then be inserted into a corresponding application specific data warehouse, including links, references, and/or pointers to other application specific data warehouses as necessary. Typical application specific data warehouses include a multimedia data warehouse 216 and a spatial data warehouse 214. The collective schema of data warehouses is referred to herein as a "multimedia data warehouse."

As mentioned above, one of the functions of the data normalization and schema mapping process 212 is to prevent duplication of data. That is, the data normalization and schema mapping process 212 ensures atomicity of the data record for a monitored telephone conversation relative to the multimedia data warehouse. From an analytical perspective, data duplication can result in missed linkages or patterns. Thus, it is desirable for the data normalization and schema mapping process 212 to maintain master tables within the plurality of application specific data warehouses (e.g., within the multimedia data warehouse). In doing so, the data normalization and schema mapping process 212 may utilize a number of methods including, without limitation, fuzzy logic, soundex and other matches, and natural language processing techniques. For example, the data normalization and schema mapping process 212 may maintain a master table of called parties. If the called party in a particular monitored telephone conversation is unique, an entry is added to the master table of called parties. If, however, the called party is already within the master table, no entry is added to the master table, though a link may be created as further described below.

As described above, where an element of a data record consists of binary data, such as a sound recording (in whole or in part) of the monitored telephone conversation, the data element may be inserted directly as a binary large object (BLOB) within the appropriate application specific data warehouse within the multimedia data warehouse. Alternatively, the data element may be stored on an external file system, with a reference to the data element within the external file system stored in the multimedia data warehouse.

Figure 3:
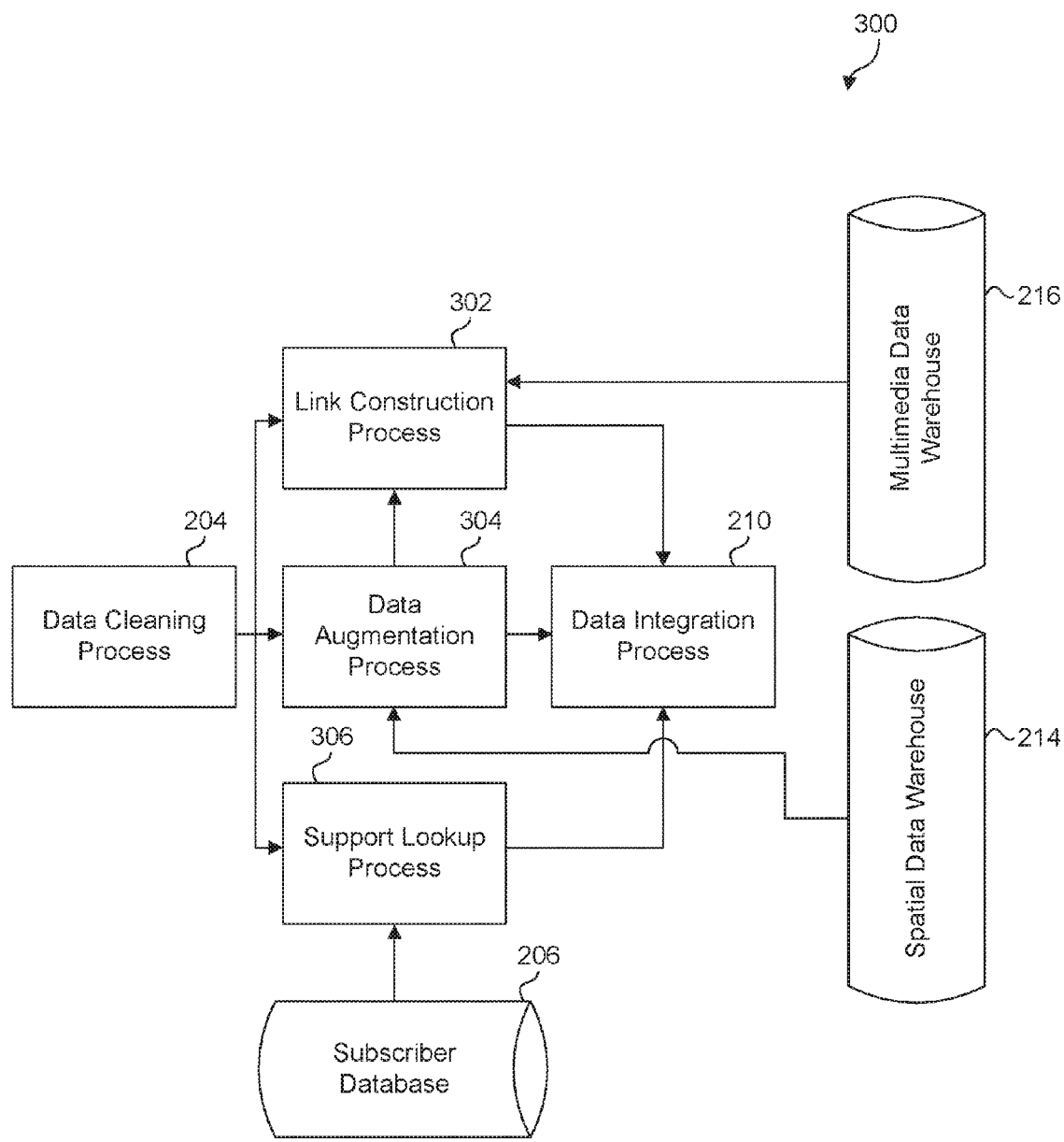
FIG. 3 is a block diagram illustrating a data augmentation process, such as that shown in FIG. 2.

FIG. 3 is a block diagram illustrating the data augmentation process 208 depicted in FIG. 2 in further detail. FIG. 3 illustrates a number of additional aspects of the data augmentation process 208 that may be incorporated into various embodiments of the present invention, depending in part upon the type of data that is being processed.

One aspect of the data augmentation process 208 involves augmentation of telephone numbers within the received data, such as the telephone number of the called party. To this end, a subscriber lookup process 306 may be coupled to an external subscriber database 206 that includes information such as the subscriber's name, the subscriber's address, the type of service (e.g., cell, POTS, VOIP), the type of subscriber (e.g., private, business, organization) and the name of the telephone company providing the service. The subscriber lookup process may access the subscriber database 206 and retrieve any or all of this information and associate it with the data record for the monitored telephone conversation.

Another aspect of the data augmentation process 208 involves augmentation of addresses within the data record.

Thus, an address matching and standardization process 304, which may be coupled to the spatial data warehouse 214, may perform a number of functions to augment addresses with geographic features. This advantageously facilitates visualization and query of data from a geographic information system (GIS) interface. The processor preferably references at least one address layer stored within the spatial data warehouse 214. The address layer may be line based, where the geographic coordinates of an address are derived via interpolation along a street segment, point based, where the geographic coordinates of an address are derived directly based upon the polygon centroids of land parcels or buildings, or a combination of both line based and point based. Typical functions performed by the address matching and standardization process 304 include, but are not limited to, address matching, spatial overlays, and address standardization. Spatial overlays add information that is not present in the original address record such as, but not limited to, census tract numbers, census block numbers, county information, and police zones or patrol sectors. This additional information can then be used for strategic analyses of calling patterns. The spatial data warehouse preferably includes at least one spatial index of the spatial features extracted in the address matching and standardization process 304.

Also shown in FIG. 3 as an aspect of the data augmentation process 208 is a link construction process 302. The link construction process 302 creates logical links between entities such as addresses, persons, organizations, places, and telephone numbers so that data may be visualized and queried from a link charting interface. The link construction process 302 adds intersection entries between atomic entities (e.g., links between the data record for the monitored telephone conversation and one or more data records or master table entries within the multimedia data warehouse) that describe each link that has been established within the data Examples of such intersection entries include, but are not limited to, inmates that called a specific telephone number, subscribers of telephone numbers, home addresses of inmates, relatives of inmates, and an address linked to a telephone number. As described above in connection with data normalization and schema mapping processor 212, it is desirable to verify the existence of atomic entities within the multimedia data warehouse 216 and the spatial data warehouse 214 (e.g., within the multimedia data warehouse) before constructing links.

Figure 4:
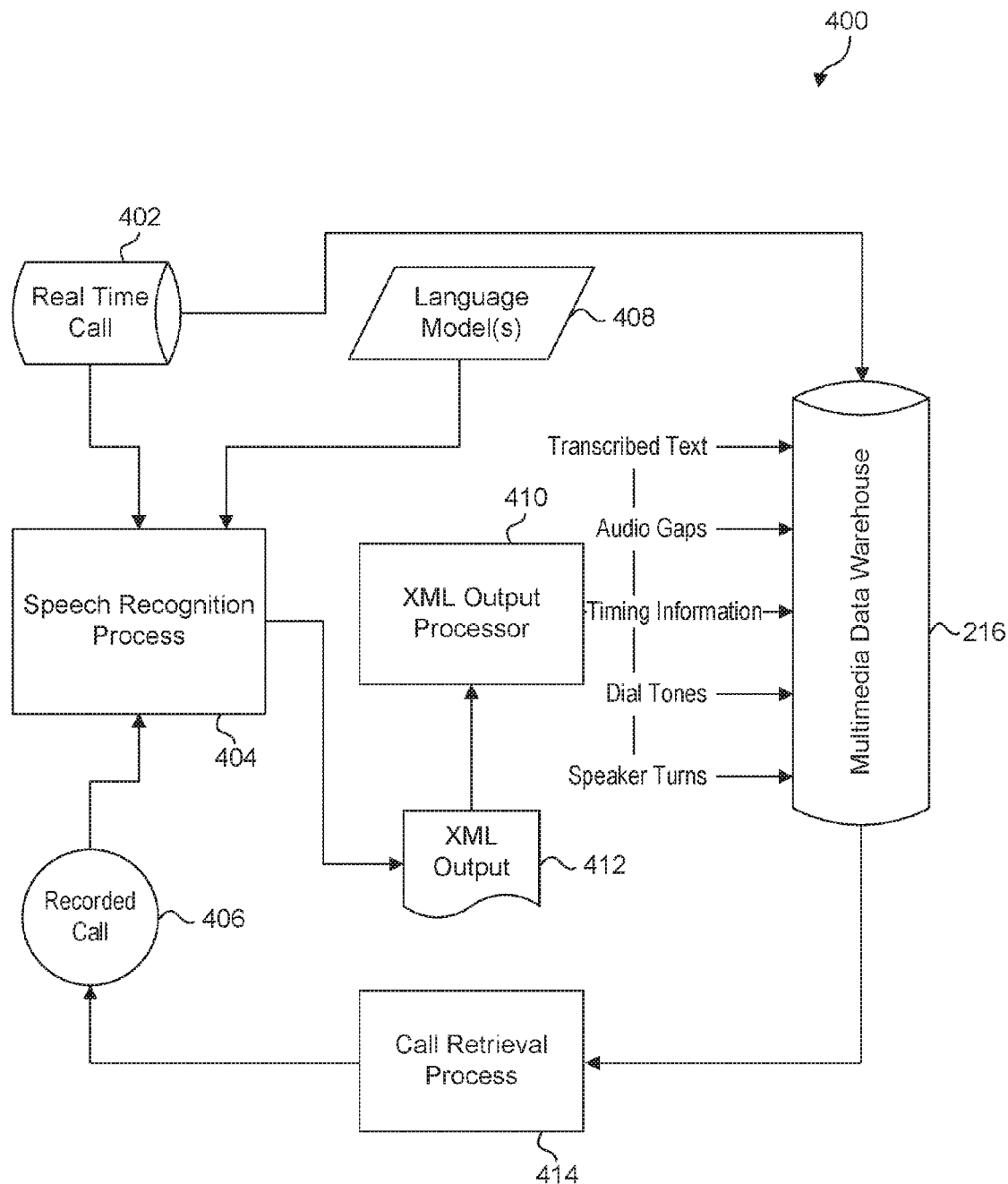
FIG. 4 is a block diagram illustrating a speech recognition system according to an embodiment of the present invention.

FIG. 4 is a block diagram illustrating a speech recognition system 400 according to an embodiment of the present invention. The speech recognition system of FIG. 4 may be software-implemented (e.g., a software program executed by one or more computer systems or speech recognition processors), hardware-implemented (e.g., as a series of instructions stored in one or more solid-state devices), or a combination of both. It should also be understood that multiple instances of the speech recognition system of FIG. 4, may be simultaneously executed on a single computer or on multiple computers.

In FIG. 4 the speech recognition process 404 processes previously recorded telephone conversations 406 or ongoing telephone conversations 402, which are referred to interchangeably herein as "monitored telephone conversations", "telephone conversations", "conversations", or simply "calls". Previously recorded telephone conversations may be obtained through a call retrieval process 414 that retrieves calls that have not yet been speech recognized from the multimedia data warehouse 216 or the external file system in which the sound recordings are stored based upon references within the multimedia data warehouse 216.

Speech recognition process 404 performs a number of functions, of which one is converting the spoken audio to text (transcription). Preferably, the entire conversation is transcribed, but it is contemplated that only portions of the conversation may be transcribed as well. In doing so, the speech recognition process utilizes at least one language mode1408. When transcribing speech to text, it is desirable to ensure that the language model used is domain specific. A "domain specific" language model is a language model that accurately reflects the linguistic nuances of the participants of a telephone conversation, for example a language model that is domain specific to inmate speech or telephony. Preferably, therefore, at least one domain specific language model is used.

In some embodiments of the invention, it is contemplated that multiple domain specific language models may be used, which may be trained for a plurality of ethnic groups, a plurality of regional dialects, or other language differences. Using multiple domain specific language models has been shown to significantly improve speech recognition and transcription accuracy. It is also contemplated that, in instances where foreign languages are spoken, multiple domain specific language models trained for a plurality of foreign languages may be used. Further, a translation processor may be utilized to translate the transcript of the monitored telephone conversation from a first language to a second language (e.g., to translate a conversation from Spanish into English).

In addition to converting spoken audio into text, the speech recognition process extracts a number of verbal and non-verbal characteristics from the telephone conversation. These include, but are not limited to, speaker turns (e.g., as determined by voice recognition of the speakers in the telephone conversation); gaps in audio; dial, pulse and ring tones; verbal cues (e.g., mentions of telephone numbers, mentions of people or organizations to call, or telephone salutations such as "hello," "hi," and the like); speech and phraseology patterns; and timing information that includes the beginning and end times (e.g., as measured in either seconds or milliseconds from the beginning of the telephone conversation) of utterances, audio gaps, dial, pulse and ring tones, and speaker turns. The characteristics are preferably associated with the transcript of the monitored telephone conversation.

Once the speech recognition process has completed processing the telephone conversation, it outputs the results to a file. One suitable format for the output file is an XML file 412 the output file is then processed by an output processor 410 that extracts each component from the XML file and inserts it as a call record into the Multimedia data warehouse 216, for example as a binary large object (BLOB). That is, as illustrated in FIG. 4, the multimedia data warehouse 216 stores at least the transcript of the monitored telephone conversation and the associated characteristics of the monitored telephone conversation. The telephone conversation is now ready for further processing.

Figure 5:
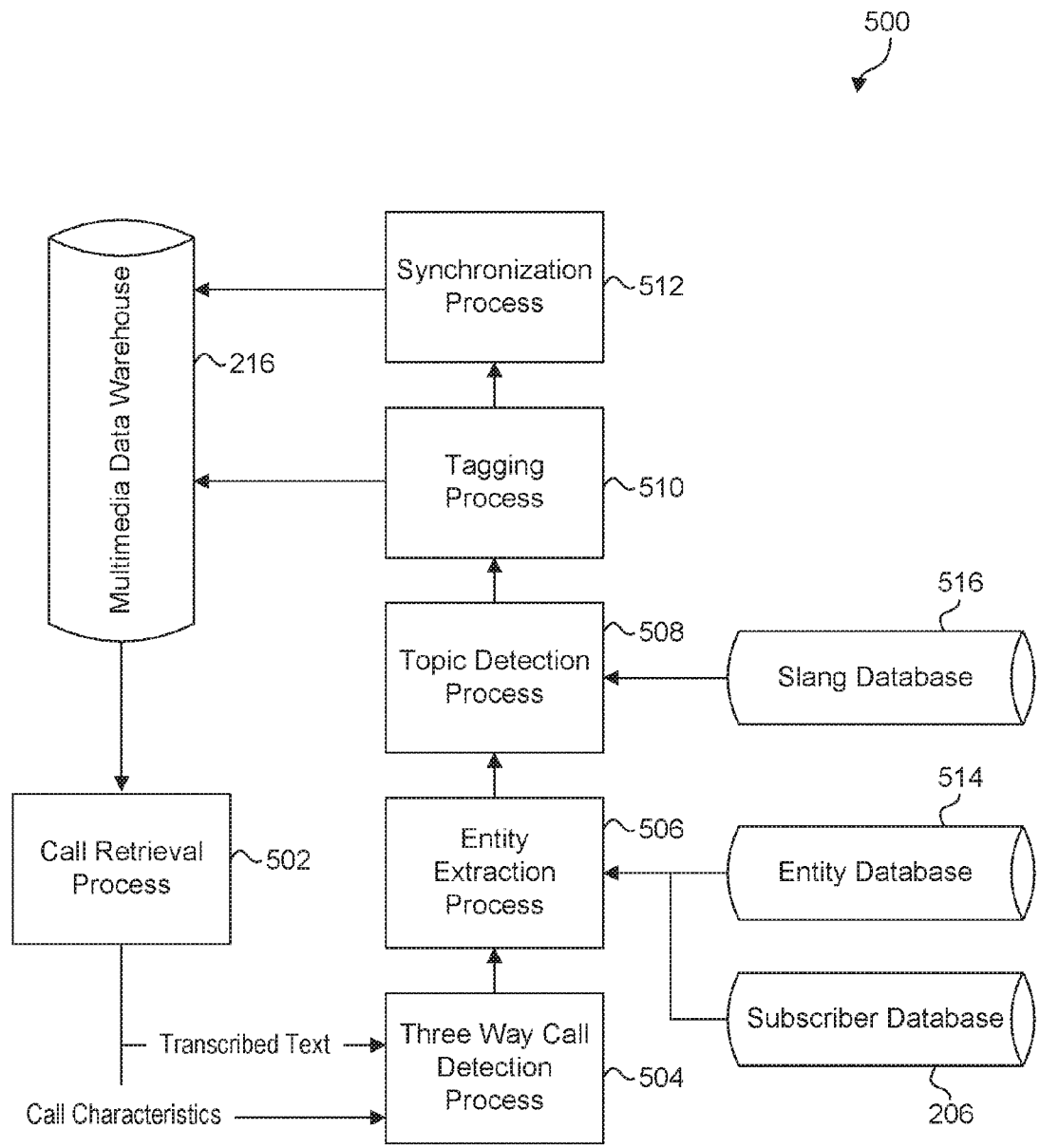
FIG. 5 is a block diagram illustrating a transcript and call characteristic processing method according to an embodiment of the present invention.

FIG. 5 is a block diagram illustrating a transcript and call characteristic processing system 500 according to an embodiment of the present invention. The transcript and call characteristic processing system 500 data-mines the monitored telephone conversation to detect events, such as three-way calls, entities mentioned, and topics discussed, such that the data record for the monitored telephone conversation may be updated to include information indicative of the events detected, which in turn improves the efficacy of queries of the multimedia data warehouse. It should be understood that multiple instances of the transcript and call characteristic processing system of FIG. 5 may be simultaneously executed on a single computer or on multiple computers.

As shown in FIG. 5, a call retrieval process 502 retrieves a telephone conversation that has been previously processed by the speech recognition system 400 from the multimedia data warehouse 216, including at least the call transcript and any characteristics extracted by the speech recognition system 400. Of course, the call retrieval process 502 may also retrieve any other data that is related to or associated with the data record that may be of use in the transcript and call characteristic processing system 500. Once the monitored telephone conversation and associated data have been retrieved, an event detection process, several aspects of which will be described in further detail below, analyzes the monitored telephone conversation to detect one or more events therein. The term "events," as used herein, includes, but is not limited to, the addition of one or more third parties to the monitored telephone conversation, the mention of one or more entities (e.g., phone numbers; individual, business, organization, or place names or abbreviations; addresses or locations; dates; times; monetary amounts; slang phrases), and the discussion of one or more topics (e.g., terrorism; suicide; drugs; violent crime).

One aspect of the event detection process detects three-way calls-that is, the addition of one or more third parties to the monitored telephone conversation. Thus, a three way call detection process 504 may analyze the monitored telephone conversation (e.g., the transcript and the plurality of characteristics of the monitored telephone associated therewith) for evidence of one or more additions of third parties within the telephone conversation transcript and associated call characteristics. Upon successful detection of a three way call, information regarding the addition of a third party may be generated and added to the plurality of call characteristics extracted in FIG. 5. Also added to the characteristics in some embodiments of the invention may be a score that indicates the degree of confidence that a three way call has been detected. This score can then later be used to restrict records returned as a result of queries to a minimum threshold of confidence and thus limit the number of false positive results. One suitable system and method for three way call detection is described in the '_application (Attorney Docket No. FIDO-0200), though it is contemplated that other three way call detection methods and systems may be employed without departing from the spirit and scope of the present invention.

Another aspect of the event detection process is the detection of one or more entities mentioned during the monitored telephone conversation, as well as, in some embodiments of the invention, the point during the monitored telephone conversation at which the entity was mentioned. Accordingly, upon completion of three way call detection, an entity extraction process 506 may search the transcript and extract entities therefrom. The term "entities" includes, but is not limited to, person names, names and abbreviations of organizations, addresses, place names, telephone numbers, dates, times and monetary amounts.

In some embodiments of the invention, the entity extraction process utilizes at least one domain specific Hidden Markov Model (HMM) that is stored in an external entity database 514 and one or more suitable search algorithms including, but not limited to, Viterbi searches, to maximize the likelihood that each utterance in the transcript does or does not represent all or part of an entity, and, if it does represent all or part of an entity, what the nature of the entity is (e.g., distinguishing a phone number from a monetary amount). A variety of other techniques including, but not limited to, string matches of known entities and heuristic methods to determine whether a sequence of numbers uttered during a telephone conversation represent a telephone number, may also be used as part of the entity extraction process.

If the entity extraction process determines that a telephone number has been uttered in the telephone conversation, the telephone number may be looked up in the subscriber database 206 to verify whether it is indeed a registered telephone number. If it is a registered telephone number, subscriber information may be added as in the subscriber lookup process 306 depicted in FIG. 3 and described above. Alternatively, the telephone number may simply be extracted from the monitored telephone conversation and associated therewith. Similarly, if the entity extraction process determines that an address or location has been uttered, the address or location may be looked up in a spatial information database, for example as described above in connection with the address matching and standardization process 304.

It is desirable to ensure that the entity extraction process utilizes at least one domain specific Hidden Markov Model that accurately reflects the linguistic nuances of the participants of a telephone conversation, for example, a Hidden Markov Model that is domain specific to inmate speech or telephony. Preferably, therefore, at least one domain specific Hidden Markov Model is used. In some embodiments of the invention, it is contemplated that multiple Hidden Markov Models may be used, which may be trained for a plurality of ethnic groups, a plurality of regional dialects, or other language differences. It is also contemplated that, in instances where foreign languages are spoken, multiple domain specific Hidden Markov Models trained for a plurality of foreign languages may be used. Using multiple domain specific Hidden Markov Models has been shown to significantly improve recognition accuracy within entity extraction processes and to minimize false positive identification of entities. It is also contemplated that in some embodiments of the present invention the plurality of Hidden Markov Models may incorporate trigrammatic transitional word probabilities in addition to bigrammatic transitional word probabilities.

Upon completion of the entity extraction process 506, a topic detection process 508 may determine one or more topics discussed during the telephone conversation and the point or points during the telephone conversation the topics were discussed. In the preferred embodiment of the invention, the topic detection process 508 matches phrases contained in an external topic database, such as slang database 516. One advantage of using a slang database is that it provides a repository of slang utterances that may be made during a telephone conversation including, but not limited to, prison slang, gang slang, radical religious slang, terrorism related slang, slang for weapons, violence, and threats of violence, and drug related slang. Preferably, each slang term within the slang database is associated with both a major topic and a minor topic, though it is within the spirit and scope of the invention to associate any number of topics with a particular slang term. For instance, for the slang term "blow" a major topic might be drugs and a minor topic might be drug dealing. By detecting topics discussed during a monitored telephone conversation by analyzing at least the transcript of the monitored telephone conversation, a user, such as a correctional officer, may query the multimedia data warehouse for telephone conversations involving discussions of, for example, drags in general and drug dealing in particular without having to know the exact phrase or phrases used during the conversation. Of course, additional slang categories may also be incorporated within the topic database.

Other topic detection techniques are also regarded as within the spirit and scope of the present invention. Such techniques include, but are not limited to: text clustering techniques; and at least one domain specific Hidden Markov Model combined with at least one domain specific topic language model that perform automated topic annotation of inmate telephone conversations. In some embodiments of the invention, it is contemplated that multiple domain specific Hidden Markov and topic language models may be used, which may be trained for a plurality of ethnic groups, a plurality of regional dialects, or other language differences. It is also contemplated that, in instances where foreign languages are spoken, multiple domain specific Hidden Markov and topic language models trained for a plurality of foreign languages may be used. Using multiple domain specific Hidden Markov and topic language models has been shown to significantly improve recognition accuracy within topic segmentation and annotation processes and to minimize false positive annotation of topics. It is also contemplated that in some embodiments of the present invention the plurality of Hidden Markov and topic language models may incorporate trigrammatic transitional word probabilities in addition to bigrammatic transitional word probabilities.

Once the topic detection process has been completed, a tagging process 510 may tag the monitored telephone conversation with information indicative of each event (e.g., each three way call, entity, slang phrase, and topic) of the telephone conversation being processed that was detected by the event detection process. The tags may then be added to the multimedia data warehouse 216 as part of the call record, for example as call record metadata (which is distinct from the underlying actual data such as the sound recording of the telephone conversation and the transcript thereof).

The tagging process 510 then passes control to the synchronization process 512. The synchronization process identifies timing information for the detected events (e.g., the likely beginning and, where applicable, end of each detected three way call, entity mention, phrase and topic discussion). For example, the synchronization process 512 may add one or, where applicable, two time stamps or other timing information to a sound recording of the monitored telephone conversation, where the timing information identifies the number of seconds or, in some embodiments, milliseconds from the beginning of the call at which a three way call, utterance of an entity, or discussion of a topic began and/or ended. The synchronization process 512 may also add position information about how many words or characters into the transcript a three way call, utterance of an entity, or discussion of a topic began and/or ended. Adding timing and/or position information advantageously may permit a user reviewing the monitored telephone conversation to "jump" directly to the point in the conversation where the three-way call occurred, where a particular entity was mentioned, or where a particular topic was discussed, thereby avoiding the need to review the entire conversation.

The multimedia data warehouse 216 may also be updated to include at least one index of three way calls, topics and entities and the characteristics associated with them.

Figure 6:
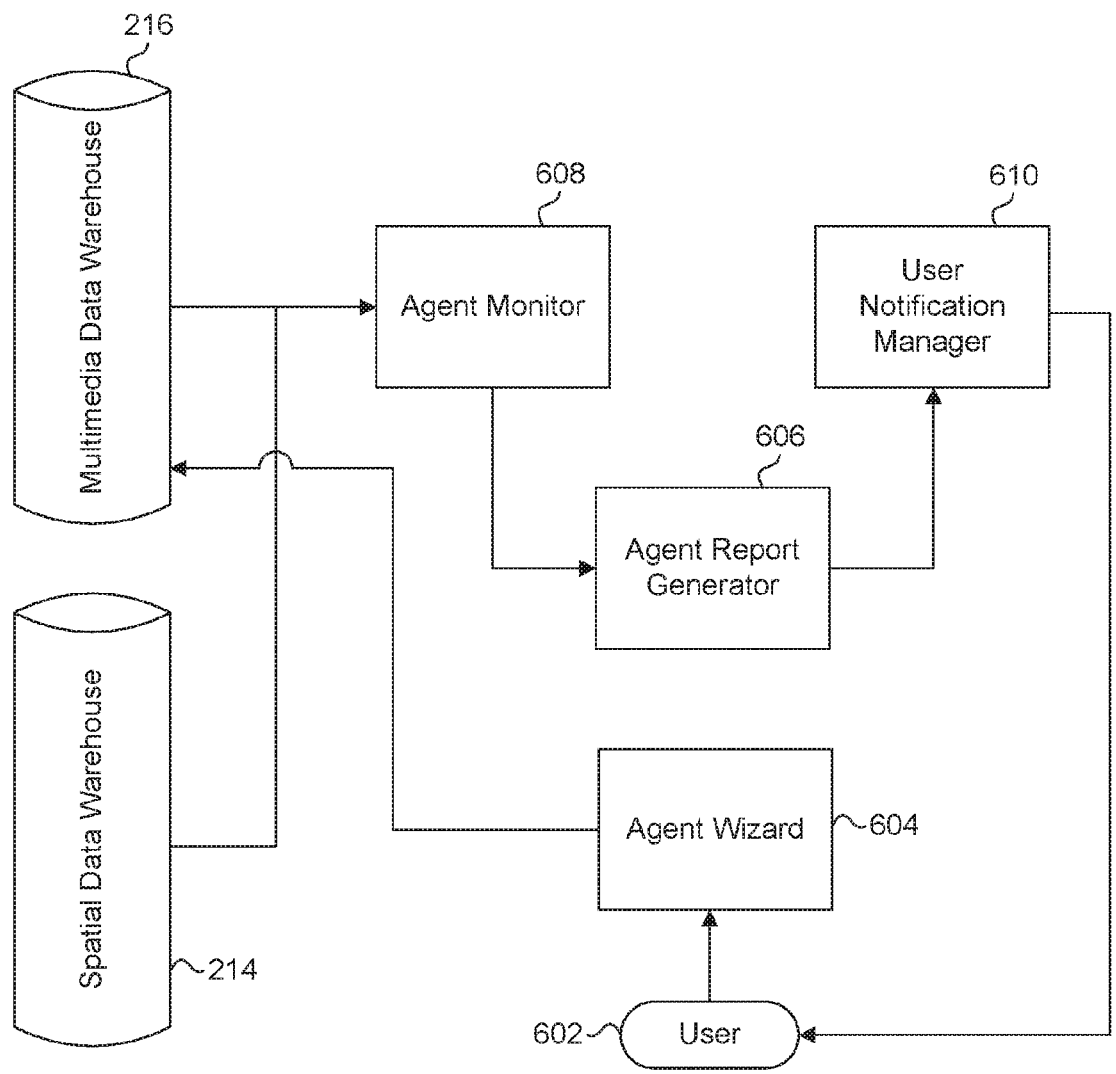
FIG. 6 is a block diagram illustrating a database agent and user notification system according to an embodiment of the present invention.

FIG. 6 is a block diagram illustrating a database agent and user notification system 600 according to an embodiment of the present invention that may be used to create a database agent that continuously monitors the plurality of application specific data warehouses (e.g., the multimedia data warehouse) for the addition of monitored telephone conversations that involve a plurality of possible characteristics or that meet preset or user-defined search criteria including, but not limited to: specific inmates, called telephone numbers, discussed topics, slang used, entities mentioned, three way calls, and any combination of the preceding characteristics. It is also contemplated that the search criteria may be selected to permit the automated monitoring of patterns of activity, including, but not limited to: multiple calls from a plurality of inmates to the same telephone number where drug dealing is a topic; calls from inmates where gang related topics are detected where the called telephone number is located in a geographic area known to be frequented by gang members; and any telephone conversation where a link is established between two entities that was previously unknown, such as a three way call from an inmate to a telephone number that belongs to a known drug dealer.

As shown in FIG. 6, a user 602, such as a corrections officer, investigator, or similar person, uses a software based agent wizard 604 to create a software based database agent that is typically stored within the multimedia data warehouse 216, though the agent could be stored anywhere within the multimedia data warehouse. The database agent preferably includes contact details for the user and at least one method by which the user prefers to be notified in the event that the database agent detects the addition one or more call records that match the search criteria of the database agent.

An agent monitor 608, which is typically a software program, but may be hardware-implemented without departing from the spirit and scope of the present invention, picks up the newly created database agent and continuously monitors the multimedia data warehouse (e.g., the spatial data warehouse 214 and the multimedia data warehouse 216) for any new records or patterns that match the search criteria defined in the database agent. Some embodiments of the present invention may deploy multiple agent monitors simultaneously on one or more computers. It is also contemplated that a plurality of specialized agent monitors may be executed simultaneously including, but not limited to: application specific agent monitors, agent monitors that specialize in pattern detection, and agent monitors that specialize in less complex queries. It should also be understood that, in addition to executing within the multimedia data warehouse as a stored procedure, the agent monitor may also be stored and executed externally as a software process.

Upon detecting the addition of a call record, pattern, or other criteria that match the search criteria of a database agent operating on or within the multimedia data warehouse, the agent monitor 608 forwards the call record, pattern or other criteria to an agent report generator 606. The agent report generator constructs a report that includes a plurality of aspects of the call record, pattern, or other criteria. A report may include, but is not limited to, call transcripts, subscriber information, inmate details, a detailed description of the identified pattern, and a listing of phrases that matched the database agent criteria.

Figure 7:
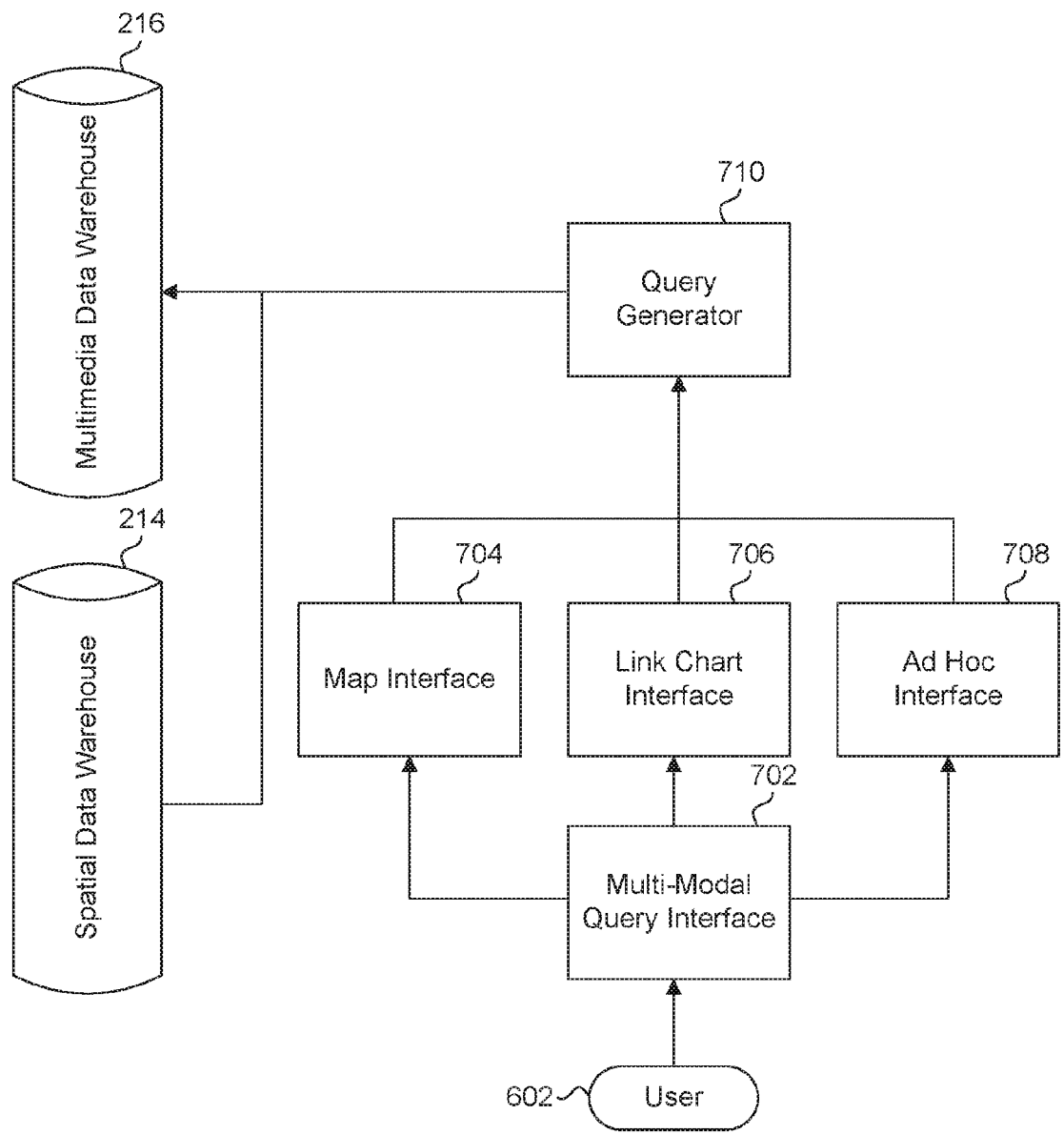
FIG. 7 is a block diagram illustrating a generalized multi-modal query system according to an embodiment of the present invention.
Figure 8:
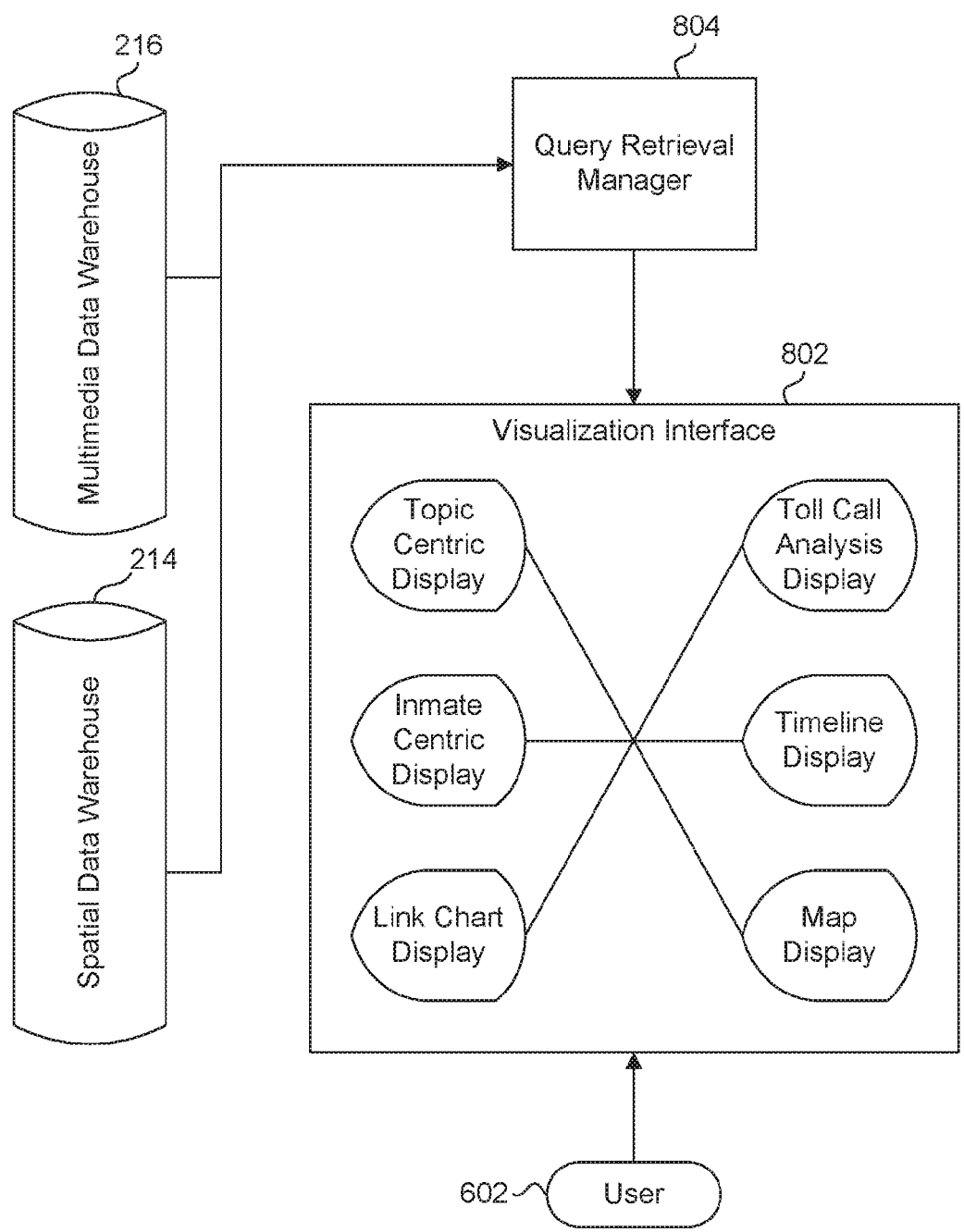
FIG. 8 is a block diagram illustrating a generalized multi-modal query retrieval system according to an embodiment of the present invention.

The report is then forwarded to a user notification manager 610. The user notification manager notifies the user that created the database agent via the at least one method by which the user prefers to be notified and, optionally, may also forward a copy of the report generated by the agent report generator 606. Notification methods include, but are not limited to: email, pager, voice mail or database alerts that are triggered the next time the user logs in to the query and retrieval systems, such as illustrated in FIG. 7 and FIG. 8. Notification may also be provided by automated voice mail, in which case a text to speech processor that reads the report to voice mail may be incorporated in database agent and user notification system 600.

FIG. 7 is a block diagram illustrating a generalized multi-modal query system 700 according to an embodiment of the present invention that may be used to retrieve records from the multimedia data warehouse (e.g., the multimedia data warehouse 216 and the spatial data warehouse 214). A user 602, such as a correctional officer, investigator, or similar person, accesses a multi-modal query interface 702, which in turn consists of a plurality of interfaces, each of which is application, or mode specific. In some embodiments of the invention, the mode specific interfaces consist of a map interface 704, a link chart interface 706, and an ad hoc interface 708. Query criteria may be selected using one or more of the mode-specific interfaces. For example, a user may want to search the multimedia data warehouse for all calls to a particular geographic region, involving gang related topics, where a link exists between a number of certain inmates and at least one telephone number for which the subscriber address lies within the selected geographic region.

Upon completion of the selection of query criteria, the criteria are forwarded to a query generator 710. The query generator translates the multi-modal query into, for example, SQL code that can then be applied to the multimedia data warehouse 216, the spatial data warehouse 214, and any other application specific data warehouses within the multimedia data warehouse. After the SQL code has been constructed, the query generator 710 executes the query.

FIG. 8 is a block diagram illustrating a generalized multi-modal query retrieval system 800 according to an embodiment of the present invention. Upon execution of the SQL code generated by the query generator 710 shown in FIG. 7, a query retrieval manager 804 retrieves all data associated with the query and distributes the results to a plurality of modes of Visualization within the visualization interface 802. In the embodiment of the present invention illustrated in FIG. 8, the visualization interface consists of: a topic centric display which displays the retrieved data arranged by topic a toll call analysis display which automatically performs a toll call analysis of telephone numbers associated with the retrieved data; an inmate centric display which arranges the retrieved data by inmate; a timeline display which automatically arranges all calls and patterns retrieved temporally; a link chart display which automatically creates a link chart showing the connections between the entities, topics, phrases and other call characteristics retrieved by the query; and a map display which maps the addresses associated with the data retrieved by the query.

It should be contemplated that other embodiments of the invention may include other types or combinations of analytical display and modes of visualization without limitation. Other embodiments of the invention may also utilize additional external application servers in instances where web-based services are used. These include, but without limitation, a geographic information system application server and a link charting application server. For modes of visualization that permit the playback of retrieved recorded telephone conversation any characteristics identified by any of the previous processes may be visually identified within the transcript. For example, the point in a transcript where a three way call was detected may be highlighted and, optionally, where it was terminated. In some embodiments of the invention time stamps generated by the synchronization process 512 illustrated in FIG. 5 may be used to navigate (or "jump") directly to the point in the conversation where the topic, entity, phrase or other detected call characteristic occurred, thereby advantageously permitting corrections officials to review only the portion of the conversation that is of particular interest. The system 800 may also include an output device or facility capable of providing synchronized playback and visualization, respectively, of the sound recording and transcript of a selected monitored telephone conversation. For example, as the sound recording of the call is played back, a moving highlight may track through the transcript.

Although only a few illustrative embodiments of this invention have been described above with a certain degree of particularity, those skilled in the art could make numerous alterations to the disclosed embodiments without departing from the spirit or scope of this invention. For example, one of ordinary skill in the art will appreciate that any of the systems disclosed herein (e.g., data transfer system 100, speech recognition system 400) may be software-implemented (e.g., a software program executed by one or more computer systems or processors), hardware-implemented (e.g., a series of instructions stored in one or more solid-state devices), or a combination of both, and that multiple instances of such systems may be simultaneously executed on a single computer or on multiple computers. In addition, it is contemplated that the various processors described herein may be integrated into one or more processors incorporated into one or more computers without departing from the spirit and scope of the present invention. Further, it is contemplated that the present invention may be practiced in real-time, near real-time, or on pre-recorded telephone conversations.

It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A system for data-mining a monitored telephone conversation, the system comprising:
   a multimedia data warehouse that stores a data record associated with a corresponding monitored telephone conversation;
   a data transformation processor configured to receive data from at least one data source, the received data including at least audio of a monitored telephone conversation and metadata information regarding the monitored telephone conversation;
   a data augmentation processor configured to augment the received data with data retrieved from one or more of a telephone subscriber database and a spatial information database based upon the metadata information regarding the monitored telephone conversation;
   a speech recognition processor configured to transcribe the monitored telephone conversation, detect a plurality of characteristics of the monitored telephone conversation, and associate the detected plurality of characteristics with a transcript of the monitored telephone conversation; and
   a data mapping processor configured to generate the data record for the monitored telephone conversation and store the data record to the multimedia data warehouse, the data record including at least the transcript of the monitored telephone conversation, the plurality of characteristics of the monitored telephone conversation, and the augmented received data that includes the audio, the metadata information, and the retrieved data.

2. The system according to claim 1, further comprising:
a data normalization processor configured to atomize the data record for the monitored telephone conversation with respect to the multimedia data warehouse; and
a link creation processor configured to create one or more logical links between the data record for the monitored telephone conversation and one or more data records within the multimedia data warehouse.

3. The system according to claim 2, wherein the data normalization processor is configured to utilize a fuzzy logic algorithm to atomize the data record for the monitored telephone conversation with respect to the multimedia data warehouse.

4. The system according to claim 2, wherein the data normalization processor is configured to utilize a matching algorithm to atomize the data record for the monitored telephone conversation with respect to the multimedia data warehouse.

5. The system according to claim 4, wherein the matching algorithm is a soundex algorithm.

6. The system according to claim 2, wherein the data normalization processor is configured to utilize a natural language processing algorithm to atomize the data record for the monitored telephone conversation with respect to the multimedia data warehouse.

7. The system according to claim 1, wherein the at least one data source comprises an inmate telephone system.

8. The system according to claim 7, wherein the at least one data source further comprises an inmate management system.

9. The system according to claim 7, wherein the at least one data source further comprises an investigative case management system.

10. The system according to claim 1, wherein the at least one data source originates from a single correctional facility.

11. The system according to claim 1, wherein the at least one data source originates from a plurality of correctional facilities.

12. A method of data-mining a monitored telephone conversation, the method comprising:
receiving data from at least one data source, the received data including at least audio of a monitored telephone conversation and metadata information regarding the monitored telephone conversation;
retrieving data from one or more of a telephone subscriber database and a spatial information database based upon the metadata information regarding the monitored telephone conversation;
associating the retrieved data with the received data;
transcribing the monitored telephone conversation;
extracting a plurality of characteristics of the monitored telephone conversation, the plurality of characteristics being aspects of the monitored telephone conversation other than spoken words detected by the transcribing of the monitored telephone conversation;
associating the extracted plurality of characteristics of the monitored telephone conversation with a transcript of the monitored telephone conversation;
generating a data record for the monitored telephone conversation, the data record including at least the transcript of the monitored telephone conversation, the plurality of characteristics of the monitored telephone conversation, the metadata information regarding the monitored telephone conversation, and the retrieved data; and
storing the data record for the monitored telephone conversation to a multimedia data warehouse.

13. A system for data-mining a monitored telephone conversation, the system comprising:
one or more microprocessors;
a memory;
a speech recognition processor configured to transcribe the monitored telephone conversation of a user, detect a plurality of characteristics of the monitored telephone conversation, and associate the detected plurality of characteristics with a transcript of the monitored telephone conversation;
an entity database configured to associate a plurality of entities with the user, the plurality of entities corresponding to particular people, places, and/or things that may be mentioned by the user during the monitored telephone conversation;
an entity identification processor configured to analyze the transcript of the monitored telephone conversation to identify one or more entities from among the plurality of entities associated with the user mentioned during the monitored telephone conversation, following the transcribing of the monitored telephone conversation;
an event detection processor configured to analyze the transcript of the monitored telephone conversation to detect one or more events within the monitored telephone conversation based on the identified one or more entities;
a tagging processor configured to associate metadata information indicative of the detected one or more events with the transcript of the monitored telephone conversation; and
a multimedia data warehouse configured to store at least the transcript of the monitored telephone conversation and the metadata information and the characteristics associated therewith as a data record for the monitored telephone conversation.

14. The system according to claim 13, wherein the entity database includes a domain-specific Hidden Markov Model.

15. The system according to claim 14, wherein the domain-specific Hidden Markov Model is domain-specific to inmate speech.

16. The system according to claim 13, wherein the entity identification processor is configured to search the entity database using one or more Viterbi search algorithms to identify one or more entities mentioned during the monitored telephone conversation.

17. The system according to claim 13, wherein the entity identification processor is configured to apply one or more heuristic algorithms to at least the transcript of the monitored telephone conversation to heuristically identify one or more entities mentioned during the monitored telephone conversation.

18. The system according to claim 13, wherein the entity identification processor is configured to search the entity database using one or more string matching algorithms to identify one or more entities mentioned during the monitored telephone conversation.

19. The system according to claim 13, further comprising:
a multi-modal query interface configured to accept user-specified search criteria; a search processor configured to search the multimedia data warehouse and retrieve one or more data records meeting the user-specified search criteria; and
a multi-modal output interface configured to display the retrieved one or more data records.

20. The system according to claim 13, further comprising:

a multi-modal query interface configured to accept user-specified search criteria; a monitoring processor configured to monitor the multimedia data warehouse for addition of a data record meeting the user-specified search criteria; and a notification processor configured to notify a user upon addition of the data record meeting the user-specified search criteria.

* * * * *